(12) United States Patent
Nakamura

(10) Patent No.: US 7,895,367 B2
(45) Date of Patent: *Feb. 22, 2011

(54) PERIPHERAL CONTROL DEVICE AND METHOD FOR CONTROLLING PERIPHERAL DEVICE

(75) Inventor: Atsushi Nakamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/715,980

(22) Filed: Mar. 2, 2010

(65) Prior Publication Data
US 2010/0153586 A1 Jun. 17, 2010

Related U.S. Application Data

(62) Division of application No. 10/940,661, filed on Sep. 15, 2004, now Pat. No. 7,689,725.

(30) Foreign Application Priority Data

Sep. 19, 2003 (JP) .............................. 2003-328718
Sep. 3, 2004 (JP) .............................. 2004-257662

(51) Int. Cl.
 *G06F 3/00* (2006.01)
(52) U.S. Cl. .......................................... 710/8; 709/227
(58) Field of Classification Search ...................... 710/8
See application file for complete search history.

(56) References Cited

U.S. PATENT DOCUMENTS 5,710,931 A  1/1998 Nakamura et al.
6,268,869 B1  7/2001 Ugajin et al.
7,120,910 B2* 10/2006 Matsuda et al. ............. 718/102
7,577,155 B2*  8/2009 Yamamoto .................. 370/400

(Continued)

FOREIGN PATENT DOCUMENTS

JP  4-330548  11/1992

(Continued)

OTHER PUBLICATIONS

Microsoft Corporation, Windows XP Home Edition: Printer Configuration Screen Capture, 1981-2001 Copyright.

(Continued)

*Primary Examiner*—Henry W Tsai
*Assistant Examiner*—Elias Mamo
(74) *Attorney, Agent, or Firm*—Fitzpatrick, Cella, Harper & Scinto

(57) ABSTRACT

The invention provides a peripheral control device for allowing the user to select preferentially a setting of a peripheral device through a wired port. A setup utility searches a port of a printer installed onto a computer to search a pertinent printer. If the pertinent printer is found during the above searching, the peripheral control device acquires MAC address information through that port. When as a result of the searching, the pertinent printer having the same MAC address is found through a different port, the peripheral control device presents a wired port of the above-mentioned pertinent printer as a candidate in a settable port list. When changing a setting of a wireless LAN printer, the utility communicates with the printer through each printer port installed at the time of activating the setup utility, not via wireless LAN.

12 Claims, 23 Drawing Sheets

U.S. PATENT DOCUMENTS

| | | |
|---|---|---|
| 2002/0001288 A1 | 1/2002 | Fukunaga et al. |
| 2004/0193745 A1 | 9/2004 | Olbricht |
| 2005/0198369 A1 | 9/2005 | Armstrong et al. |
| 2006/0072140 A1* | 4/2006 | Mitani ...................... 358/1.13 |

FOREIGN PATENT DOCUMENTS

| | | |
|---|---|---|
| JP | 5-327715 A | 12/1993 |
| JP | 9-305508 A | 11/1997 |
| JP | 2001-310532 A | 11/2001 |
| JP | 2002-236561 | 8/2002 |

OTHER PUBLICATIONS

Louis Columbus, "Installing and Using Printers in Windows XP Professional", Sep. 7, 2001, SAMS. http://www.sampublishing.com/articles/printerfriendly.asp?p=23272.

Japanese Office Action dated Nov. 10, 2009 in corresponding Japanese Patent Application No. 2004-257662.

Japanese Office Action dated Jun. 11, 2010 in corresponding Japanese Application No. 2004-257662.

* cited by examiner

USB COMMAND
        ACCESS POINT SEARCH COMMAND
        INFORMATION ACQUISITION COMMAND
        INFORMATION SETUP COMMAND

FIG.13

```
NETWORK COMMAND
     PRINTER SEARCH COMMAND (BROADCASTING)
     PRINTER SEARCH COMMAND (ADDRESSING)
```

FIG.14

NETWORK SETUP COMMAND
SETTABLE VALUE ACQUISITION COMMAND
CURRENT VALUE ACQUISITION COMMAND
DeviceID ACQUISITION COMMAND
NETWORK INTERFACE CARD INFORMATION ACQUISITION COMMAND
SETTING VALUE WRITE COMMAND

FIG.18

PERIPHERAL CONTROL DEVICE AND METHOD FOR CONTROLLING PERIPHERAL DEVICE

This application is a divisional of U.S. patent application Ser. No. 10/940,661, filed Sep. 15, 2004 (allowed), the contents of which are incorporated by reference herein.

BACKGROUND OF THE INVENTION

1. Field of the Invention

The present invention relates to a peripheral control device and a method for controlling a peripheral device, and more specifically to a method for selecting communication between a device and host equipment each of which has a plurality of communication interfaces and can communicate with each other through each communication interface.

2. Description of the Related Art

A device having a plurality of communication interfaces can communicate with a host computer having a plurality of communication interfaces similarly by using one of these communication interfaces. Each communication path corresponding to each communication interface is established as a logical communication port between the OS and a device. For this reason, whether the printer device is physically a single device or not (a plurality of devices), a logical communication port is created for each communication interface alike, and the host computer can communicate with the device through any one of ports.

When any application on the host computer accesses the device, communication is conducted by specifying a logical communication port. In this case, the application detects a logical communication port that makes possible communication for a device having a pertinent function by a predetermined method. When a plurality of ports are detected, the application specifies an appropriate logical communication port by displaying these in such a way that a user can select it and receiving the selection or the like.

For example, when a word processor application currently executed on the host computer conducts printing, the application searches logical communication ports of the printer being connected to the host computer by a predetermined method. Subsequently, the application presents a search result to the user as, a list of logical communication ports. Then, the application receives the choice of the logical communication port to realize printing on the printer that the user intends to use.

As an example, peripheral devices include wireless equipment compatible with the specification 802.11b standardized by IEEE, such as a wireless LAN access point and a wireless router. Moreover, PCs (personal computers) that have self-contained wireless interfaces and PCs that allow wireless interfaces to be installed thereon later as PCMCIA cards are sold widely. With printers, one-to-one connection with a PC through a local interface, such as USB, has been so far common. However, there is a growing demand for a networking capability of supporting such a need that a plurality of PCs can execute printing thereon even in home.

When conducting printing using a wireless LAN, the following must be done: a wireless LAN setting is established in the printer so that the printer can communicate with the access point; software enabling wireless LAN printing is installed onto the PC; and an appropriate setting is made for the printer. Conventional installation of a printer driver necessitates some degree of knowledge about a network in device setting for establishing network connection. Moreover, in wireless interface connection, knowledge about the wireless interface is needed as well. For this reason, there is a so-called utility application that is executed by the host computer side in order to communicate with these wireless/network devices and change wireless setting and network setting to support the user when using these devices. However, there is often the case that this application presents all logical communication ports through which communication with the object device can be performed as choices of a communication port for the setup. For example, in the case where a plurality of printers each equipped with both a USB interface and a wireless network interface are connected to the host computer and the both interfaces of each printer are in operable modes, the setup utility application of this printer presents all logical communication ports each of which makes communication possible as choices of communication port for the setup, and consequently logical communication ports for both USB and wireless interfaces will be displayed.

Therefore, it is difficult for the user to judge which two logical communication ports belong to the identical printer, and also it is difficult to judge which logical communication port can be used without affecting communication due to a change of the setting.

In addition, even when the user sets up an operation of a wireless interface and changes a setting of a network using a utility application like this, all logical communication ports each of which makes communication possible are presented as choices of communication port to be used for the setup. Accordingly, when the user changes the setting through the communication interface or network that the user intends to change, there may be a case where the user will be not able to perform communication as described above after the change depending on the selection of the port. After all, even if the user uses the utility application, there may be a case where it becomes impossible to change the setting or confirm a communication state continuously. The present invention discloses means for solving at least one of the above described problems.

SUMMARY OF THE INVENTION

The object of the present invention is to provide a peripheral control device and a method for controlling a peripheral device that, when setting up a printer in which communication through a plurality of logical communication ports is established, makes possible a setup operation through a specific kind of port preferentially and hence eliminates a possibility that a setup operation becomes impossible to check.

According to a first aspect of the present invention, a peripheral control device set forth by the present invention is a peripheral control device of controlling a peripheral device in which communication is established, comprising detecting means for detecting a logical communication port connected to the peripheral device, and controlling means for, when a plurality of logical communication ports are detected by the detecting means for the identical peripheral device, allowing a computer to set up the peripheral device through a logical communication port with the highest priority among priorities preassigned to the plurality of detected logical communication ports, thereby prohibiting to set up the peripheral device through any of the remaining logical communication ports.

Here, the peripheral control device may further comprise displaying means for displaying a selection screen of logical communication ports used in selecting a predetermined kind of logical communication port, the selection screen being used for enabling a user to change a setting of the peripheral device side of the selected logical communication port.

Moreover, the peripheral control device may further comprise acquisition means for acquiring a MAC address of the peripheral device through each of the logical communication ports detected by the detecting means, and the controlling means may assume logical communication ports for which the same MAC address was acquired by the acquisition means as logical communication ports of the identical peripheral device.

According to a second aspect of the present invention, a peripheral control device set forth by the present invention is a peripheral control device for controlling a peripheral device in which communication through a first logical communication port and a second logical communication port is established, the peripheral control device comprising setting changing means for changing a setting of the second logical communication port through the first logical communication.

Here, the first logical communication port may be a USB interface, and the second logical communication port may be a wireless interface.

According to a third aspect of the present invention, a method for controlling a peripheral device set forth by the present invention is a method for controlling a peripheral device that is performed by a computer connected to the peripheral device, wherein the method executes a step of detecting logical communication ports connected to the peripheral device, and a step of, when a plurality of logical communication ports are detected, allowing the PC to set up the peripheral device through a logical communication port with the highest priority among priorities preassigned to the plurality of the detected logical communication ports, thereby prohibiting to set up the peripheral device through any of the remaining logical communication ports.

According to the fourth aspect of the present invention, a method for controlling a peripheral device set forth by the present invention is a method for controlling a peripheral device that is performed by a computer in which communication with the peripheral device through a first logical communication port and a second logical communication port is established, wherein a setting of the second logical communication port is changed through the first logical communication port.

According to the fifth aspect of the present invention, a computer-readable storage medium set forth by the present invention is one that stores a computer program for making a computer connected to a peripheral device execute a step of detecting logical communication ports connected to the peripheral device, and a step of, when a plurality of logical communication ports are detected for the identical peripheral device at the detecting step, allowing the computer to set up the peripheral device through a logical communication port with the highest priority among priorities preassigned to the plurality of the detected logical communication ports, thereby prohibiting to set up the peripheral device through any of the remaining logical communication ports.

According to the sixth aspect of the present invention, a computer-readable storage medium set forth by the present invention is one that stores a computer program for making a computer in which communication with a peripheral device through a first logical communication port and a second logical communication port is established change a setting of the second logical communication port through the first logical communication port.

According to a seventh aspect of the present invention, a peripheral control system set forth by the present invention is a peripheral control system comprising: a host computer; and a peripheral device connected to the host computer, the host computer comprising: detecting means for detecting a logical communication port connected to peripheral device; and controlling means for, when a plurality of logical communication ports are detected for the identical peripheral device by the detecting means, allowing the computer to set up the peripheral device through a logical communication port with the highest priority among priorities preassigned to the plurality of the detected logical communication ports, thereby prohibiting to set up the peripheral device through any of the remaining logical communication ports.

According to the present invention, in setting a peripheral device in which a plurality of settable logical communication ports exist in a network, a network setting application presents only one port as a choice to the user, and consequently the user will not be at a loss in selecting a port for setting.

Moreover, according to the present invention, in setting a peripheral device in which a plurality of settable logical communication ports exist in a network, if a local interface port except for network ports is detected, the network setting application presents it, and consequently it becomes possible to perform a stable setup operation.

The above and other objects, effects, features and advantages of the present invention will become more apparent from the following description of embodiments thereof taken in conjunction with the accompanying drawings.

BRIEF DESCRIPTION OF THE DRAWINGS

FIG. 13 is a view showing an example of a wireless network install command using a USB port;

FIG. 14 is a view showing an example of a command used in a wireless network;

FIG. 18 is a view showing an example of a command used in a wireless network utility;

DETAILED DESCRIPTION OF PREFERRED EMBODIMENTS

Figure 1:
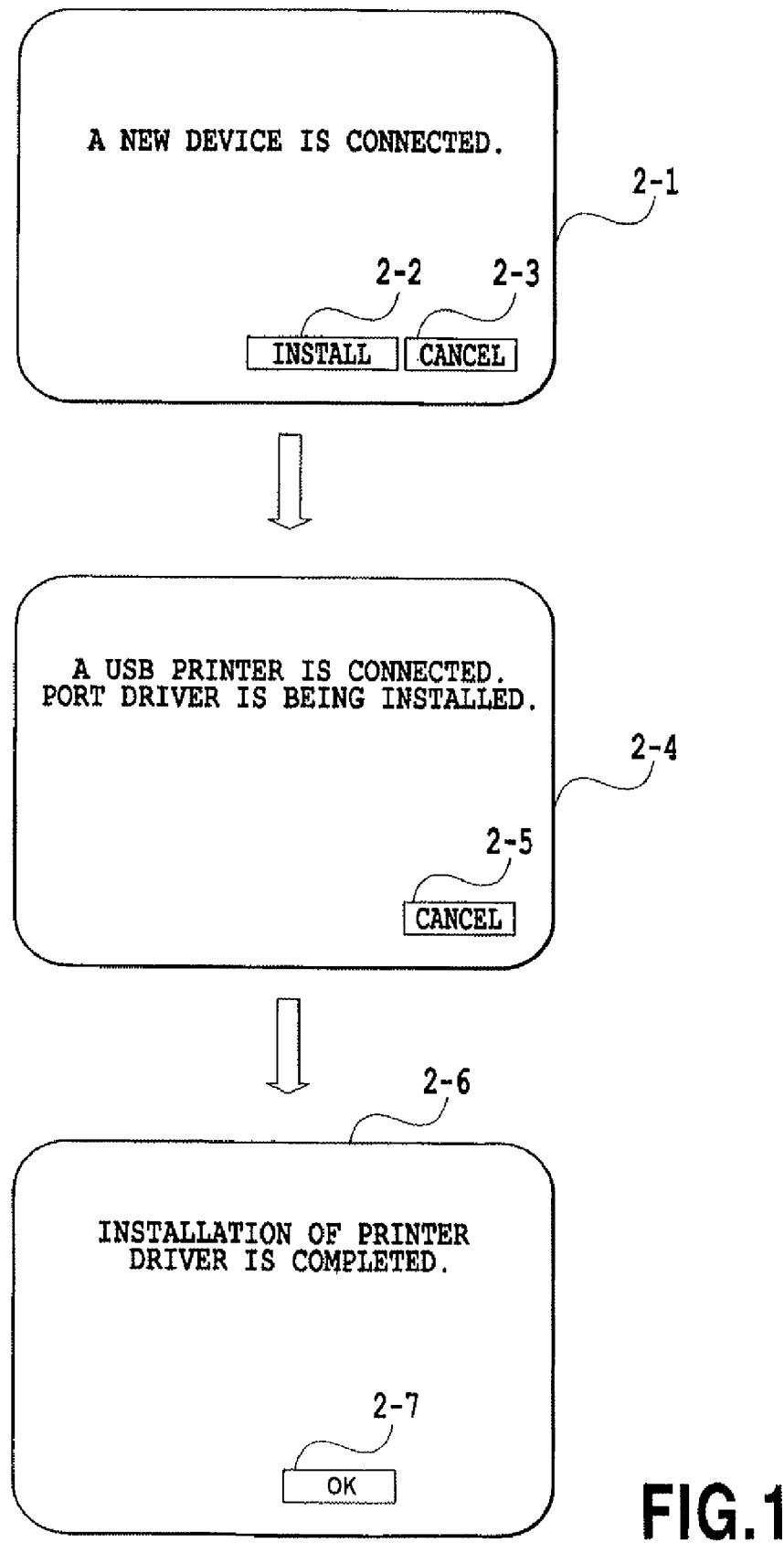
FIG. 1 is a view showing a screen displayed in a common installation procedure of a printer driver using a USB port.

Hereafter embodiments of one invention according to the present invention will be described in detail referring to the drawings. Hereinafter, general installation of a printer driver will be described with reference to FIG. 3, and then action of a utility as an example of the present invention will be described.

In conducting printing after connecting the printer to the host computer, software to control the printer is required. This software, after understanding a print command from the printing application on the operating system of the host computer, transfers a printing control command and printing data to the printer hardware in order to run a printer hardware device. The software like this to control a printer device is called a printer (device) driver. All pieces of hardware connected to the host computer, which are typified by the printer driver, are controlled by a mechanism of receiving a control instruction from the application through a device driver. The device driver is not exclusively for an upper application being activated on the operating system. Therefore, it is residing as a kind of resident program occupying a specific memory area while a device is being connected to the host computer.

Each of the latest operating systems (hereinafter referred to as "OS") which are typified by Windows® of Microsoft Corporation has a capability of installing automatically an appropriate device driver corresponding to a device when the device is connected to the host computer. Hereinafter, this capability is referred to as plug and play.

In the case of plug-and-play processing at the time of connecting a device to the host computer for the first time, if there is no optimal driver among device drivers that the OS possesses as standards, it is necessary to install onto the OS a device driver in the form of a computer-readable medium, such as a floppy disk and a CD-ROM, supplied with the device when purchasing the device. This work of installing the exclusive driver is called an "installation work of driver."

Figure 2:
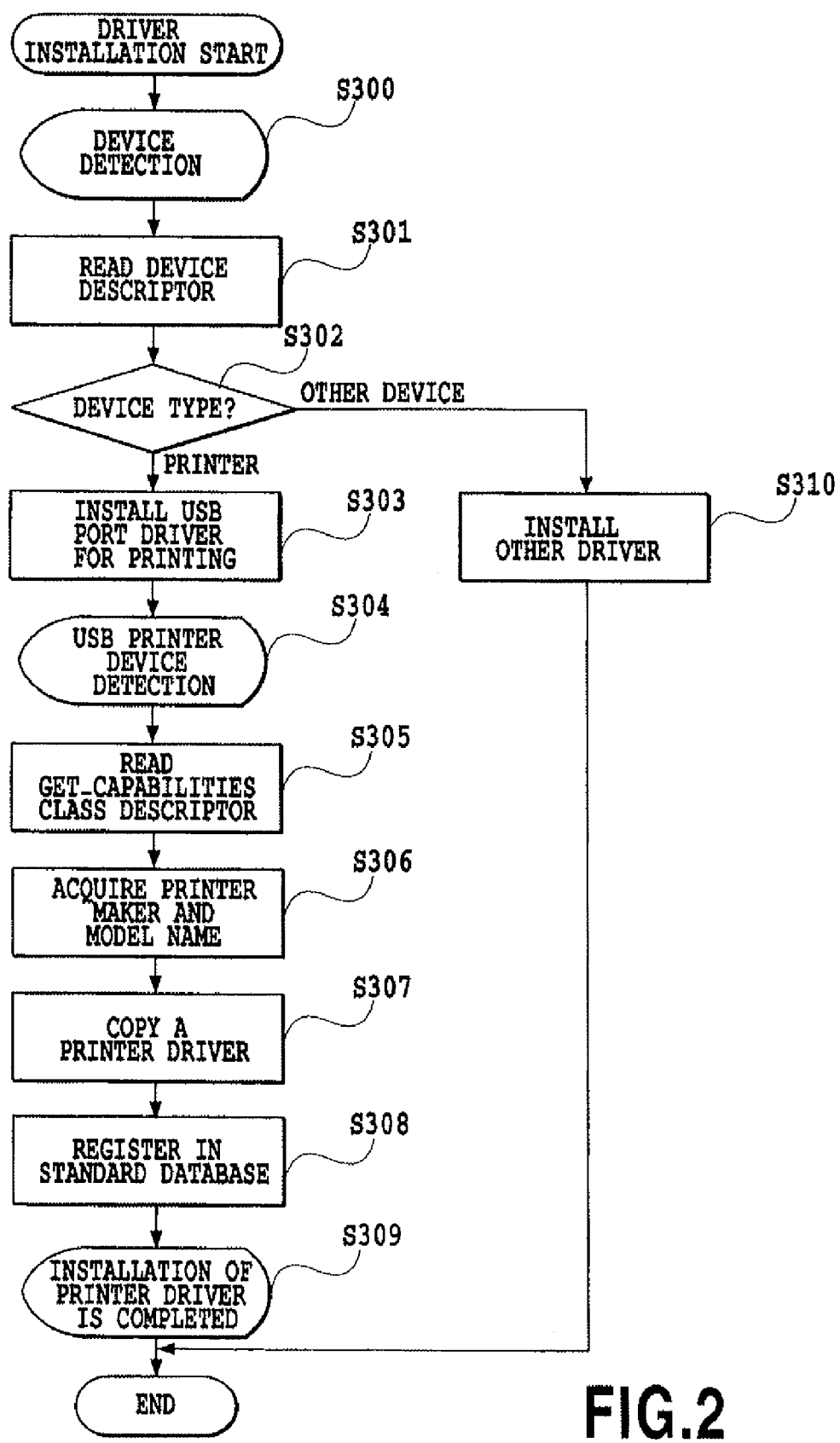
FIG. 2 is a flowchart showing a common installation procedure of a printer driver using a USB port.

General installation processing of a device driver onto the OS compliant with Plug and Play will be described below. There can be enumerated USB (Universal Serial Bus) as a typical interface compliant with Plug and Play. Here, the installation will be described taking that of a printer using a USB as an example. FIG. 1 shows a message indicated on a display of the host computer for the user, and FIG. 2 shows a sequence flow. Note that the sequence flows explained here or the messages etc. indicated are only those in the case where Plug and Play is performed normally. It goes without saying that there is an error sequence in a case of failure of Plug and Play separately. First, the user connects the printer to the host computer for the first time using a USB that is an interface compliant with Plug and Play. The OS operating on the host computer detects that the device is connected to the host computer through a USB interface (Step S300). The OS displays a screen 2-1 and reads a device descriptor that is basic information of the USB device from the printer by a predetermined method defined for the USB (Step S301). The device descriptor contains basic functional information of the device including device class information representing a device type. The OS reads and analyzes the descriptor, and thereby recognizes that the device connected to the computer is a device belonging to a printer class, i.e., a printer (Step S302).

Generally, the device driver of a printer, broadly speaking, consists of two drivers of different levels. The first one is a port driver, a lower level driver, for controlling a protocol used in performing data communication with a printer on that communication interface for each communication interface to which the pertinent device is connected. The second one is an upper printer driver that resides on an upper layer of the port driver and converts actual print application data into recording data and a printer language suited to an individual printer. The upper printer driver also acquires the operating state of the printer, i.e., its status, and delivers it to a printer state indication application.

Once the OS recognized the connected device as a USB printer class device, the OS loads an appropriate lower port driver using a predetermined method to put the printer in an operational mode. Furthermore, there is provided a port instance that is a logical connection to perform one-to-one data communication between the host computer and a specific device detected on the communication interface by controlling the port driver. In the case of a USB printer, after it was detected to be a printer class device by the descriptor and a USB port driver for printing was loaded, the OS creates a port instance that is a logical communication channel though which communication between the printer and the host computer is performed (Steps S303 and S304). Screen 2-4 is displayed at this time.

Once a lower port driver is loaded and the printer is set in an operational mode after initialization processing, the OS acquires detailed information of the printer device connected to the host computer by a predetermined method. In the case of a USB printer, this is done by issuing a read command (GET_CAPABILITIES) for device ID that is defined according to the USB printer class specification to the printer device through the port driver. The device ID sent back in response thereto includes information peculiar to the printer model, such as information on the printer manufacturer (maker), a model name, information of supported printer languages, etc. (Step S305).

The OS acquires detailed information of the maker, the model name, etc. of the USB printer device connected, by analyzing the information of the device ID (Step S306). The OS searches an optimal upper printer driver based on the information. If there is no pertinent upper driver in a standard search range of the OS, the OS requests the user to copy the pertinent upper driver to the OS by indicating a message asking to the user about a storing folder etc. of the driver. In this case, the user specifies a medium, such as a floppy disk and a CD-ROM, supplied with the device when purchasing it, a device driver downloaded from a maker's file server through the Internet, or a file in which initialization information of the device driver is described according to predetermined rules, whereby installation of the pertinent upper driver on the OS is conducted (Step S307).

Figure 3:
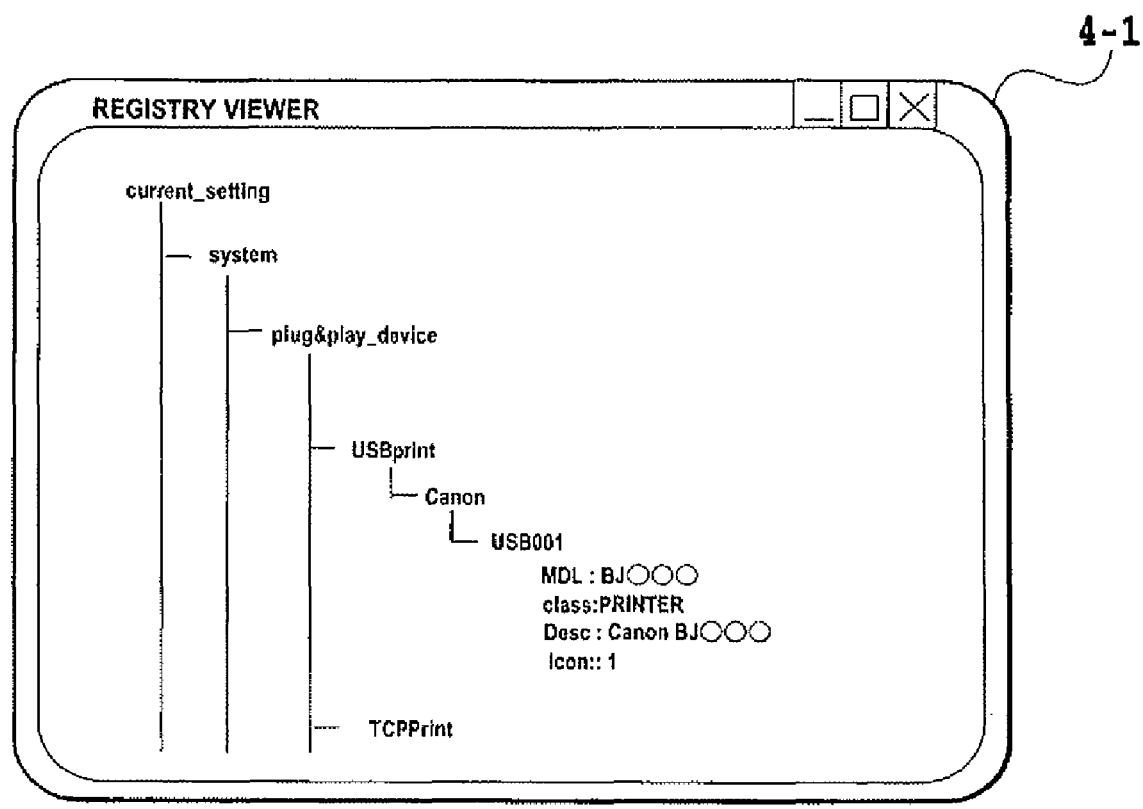
FIG. 3 is a view showing an example of a standard setting database in an OS.

At the time of installation of the upper driver, it is copied in a predetermined position (directory) on the host computer according to a predetermined procedure. Next, an item (entry) about the device whose driver is being installed is added on a setting database that the OS possesses as default (Step S308). This database stores such information as setting parameter for controlling each device, device driver configurations, lower port drivers associated with the device instances, port instance information, setting information set up by the user, etc. In Windows® 2000 and Windows® XP, which are OSs made by Microsoft Corporation, this standard setting database is generally called a registry. In this explanation below, this is also called registry. FIG. 3 shows an example of Window 4-1 in which the registry is shown in such a way that the user can recognize it.

This entry is created for each device that communicates through a port instance created by the OS detecting a device, i.e., for each logical device with reference to an upper driver to be installed. That is, an entry is prepared for each logical connection between the OS and a device, and corresponding port instance information is stored to effect association. For example, in the case where a printer equipped with a plurality of connection interfaces is connected to the OS through respective communication interfaces, port instances are created for respective communication interface. Entries of the identical printer are created on the registry as different logical devices for respective communication interfaces and for respective logical connections, although the upper printer interface to be used for these logical devices is common.

Figure 4:
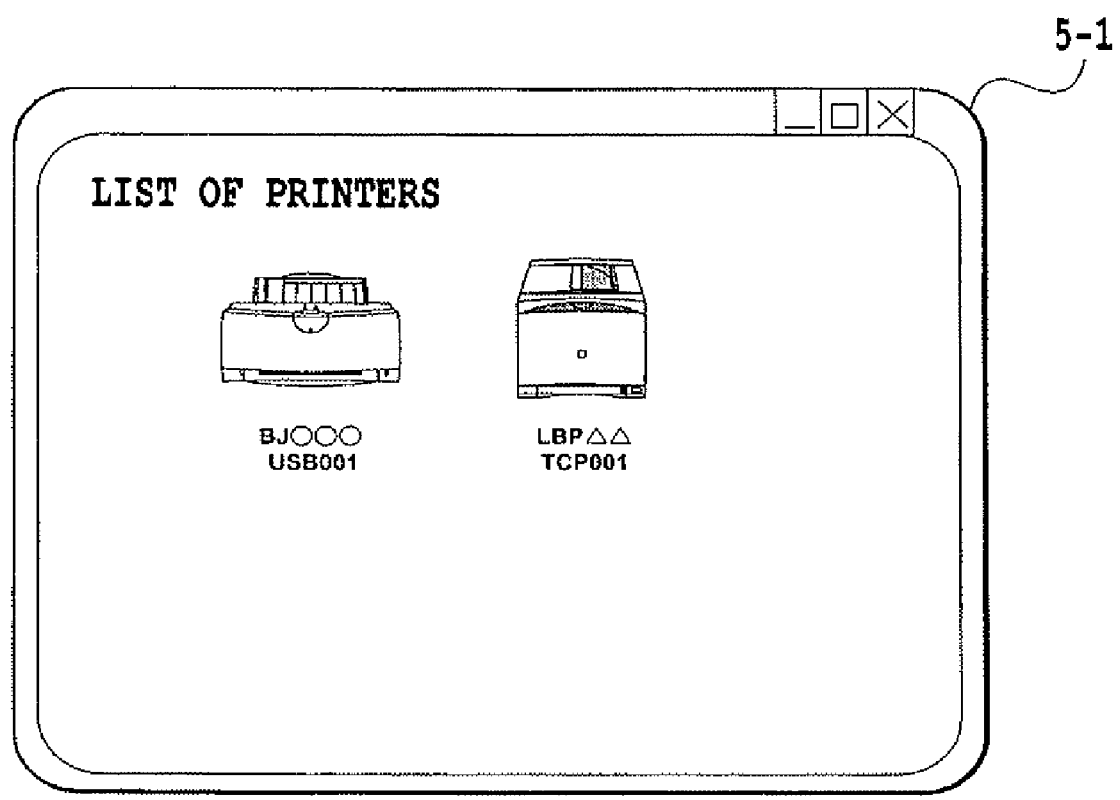
FIG. 4 is a view showing an example of the screen of a list of printers in the OS.

When preparation of driver activation is completed including copying of drivers and addition of entries to the registry as described above, the printer is indicated according to information of the database as a logical device for each entry in a list of printers of an OS's user interface and installation is completed (Step S309). Screen 2-6 is displayed at this time. In a printer list screen of the common OS equipped with a GUI, a port instance for a printer is indicated visually in the form of a printer icon. FIG. 4 shows one example of this. That is, when a plurality of port instances that pass through a plurality of communication interfaces are created for a printer, printer icons for respective output ports are indicated in predetermined Window 5-1. Information about the association between printer icons and ports is also described in an entry of the registry created for the above-mentioned each port. Therefore, information as to which ports are represented by respective printer icons visually is also managed.

In the foregoing, general Installation processing of a device driver in the OS compliant with Plug and Play was explained taking a USB printer as an example. Needless to say that although there is a case where a driver is installed by a different method depending on the type of OS, a Plug and Play device is installed by a sequence roughly similar to the explained procedure.

Note that in the case where the computer has logical communication ports each of which corresponds to a wireless interface or a wired interface for a printer, it is desirable to use the logical communication port of the wired interface from a viewpoint of communication reliability and certainty. However, if all printers detected by the computer were shown as candidate printers usable for printing, the user could not judge which logical communication port would be an optimal choice. That is, when the user uses a wireless peripheral device or a network device via the application, the user is often confused in a decision as to which device should be used.

Figure 5:
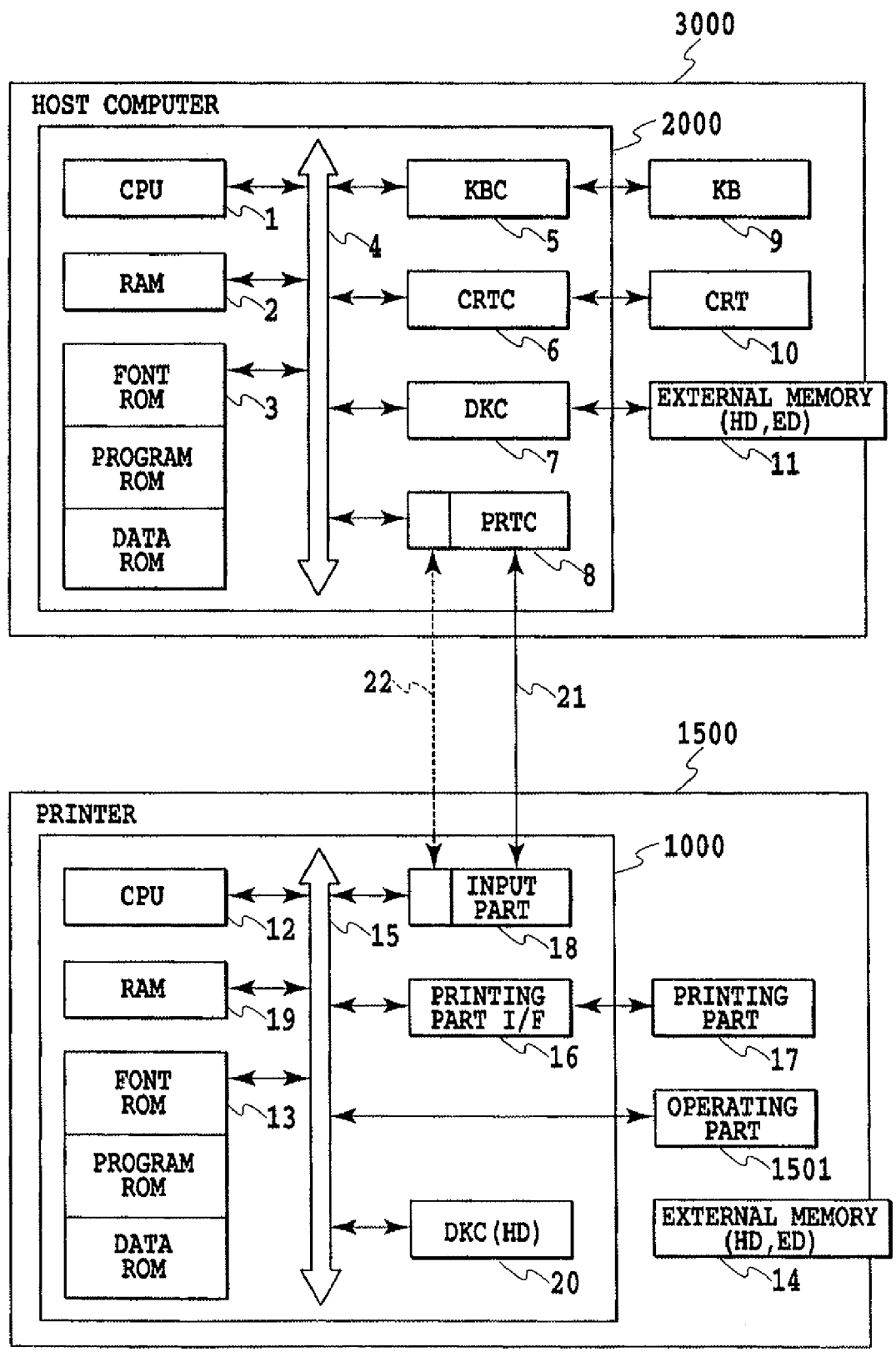
FIG. 5 is a view showing an example of a hardware block according to one embodiment of the present invention.

FIG. 5 is a view showing an example of a hardware block according to one embodiment of the present invention. Here, a computer as one embodiment of information processing equipment according to the present invention will be described. FIG. 5 is a block diagram explaining the configuration of the printer control system. Note that unless otherwise specified, naturally the present invention can be applied to any of the following devices/systems: a single device; a system consisting of two or more devices; and a system that is connected to devices through a network, such as LAN and WAN, and performs processing cooperatively, as long as they execute functions of the present invention.

In the figure, a host computer 3000 is equipped with CPU 1 that performs processing of a document in which figures, images, characters, tables including spreadsheet etc.) are mixed by means of a document processing program stored in programming ROM of ROM 3 or external memory 11 or the like. The CPU 1 comprehensively controls devices connected to its system bus 4. The host computer 3000 corresponds to the note PC 1-1 of FIG. 6.

The programming ROM of this ROM 3 or the external memory 11 stores an operating system program (hereinafter, OS) that is a control program of the CPU 1 and other data, the font ROM of the ROM 3 or the external memory 11 stores font data used in performing the above-mentioned document processing and other data, and the data ROM of the ROM 3 or the external memory 11 stores various data used in performing the above-mentioned document processing. RAM 2 functions as main memory, a work area, etc. for the CPU 1. A keyboard controller (KBC) 5 controls key inputs from the keyboard 9 or a pointing device not shown in the figure. A CRT 6 controller (CRTC) controls display of a CRT display (CRT) 10. In the case when the host computer 3000 is a note PC, a liquid crystal display is preferably used instead of the CRT because of less weight. A disk controller (DKC) 7 controls accessing the external memory 11, such as a hard is disk (HD)—for storing a boot program, various applications, font data, user files, editing files, printing control command creation programs (hereinafter, printer drivers), etc.—and a floppy disk (FD). Here, HD stores a control program related to the wireless LAN setup utility, which the CPU 1 reads and stores in the RAM 2, and executes it. Then the pertinent wirelesses LAN setup utility executes several steps illustrated in FIG. 8, FIG. 12, FIG. 16, FIG. 17, FIG. 23, etc. It is recommendable that screens of FIG. 1, FIG. 3, FIG. 4, FIG. 7, FIG. 9, FIG. 10, FIG. 11, FIG. 15, FIG. 19, FIG. 20, FIG. 21 and FIG. 22 are displayed on the CRT 10, which is one example of the display part that the host computer 3000 is equipped with, or a liquid crystal display.

A printer controller (PRTC) 8 is connected to the printer 1500 through a predetermined bi-directional interface 21 and executes controlling of communication with the printer 1500. Note that, in this embodiment, there are a plurality of interfaces though which the application communicates with the printer. They include, for example, a path 21 through the USB interface and a path 22 through the wireless LAN interface. Each of the PTRC and an input part 15 consists of a plurality of units for controlling their interfaces. Moreover, the CPU 1 performs the process of converting outline fonts into a series of dots whose information is stored in display information RAM being set up in the RAM 2 (rasterization), thereby enabling WYSIWYG on the CRT 10. The printer 1500 corresponds to the printer 1-2 of FIG. 6 that will be described later.

Furthermore, the CPU 1 opens various windows that are registered based on commands indicated with a mouse cursor and the like on the CRT 10 (not shown), and performs various data processing in line with user's setting. When executing printing, the user opens windows for setting up the printing, and is allowed to set up a manner of printing for the printer driver, including setting of a printer and selection of a printing mode.

In the printer 1500, a printer CPU 12 outputs an image signal as output information to a printing part (printer engine) 17 connected to the system bus 15 based on a control program stored in the program ROM of ROM 13 etc. or a control program stored in external memory 14 etc.

Moreover, this program ROM of the ROM 13 stores a control program of the CPU 12 etc. The font ROM of the ROM 13 stores font data etc. to be used in creating the above-mentioned output information, and the data ROM of the ROM 13 stores information to be used on the host computer etc. in the case of a printer that does not have the external memory 14 such as a hard disk.

The CPU 12 is configured to be able to perform communication processing with the host computer through an input part 18 and inform the host computer 3000 of information inside the printer etc. Reference numeral 19 is RAM that functions as main memory, a work area, etc. of the CPU 12, and is configured to be able to expand memory capacity by optional RAM connected to its expansion port (not shown). Incidentally, the RAM 19 is used for an output information expansion area, an environmental data storing area, NVRAM, etc. Accessing the external memory 14 described above, such as a hard disk (HD) and an IC card, is controlled by a memory controller (MC) 20.

The external memory 14 is connected as an option to store font data, emulation programs, form data, etc. Moreover, the operational panel 18 described above is equipped with switches used for operation, LED display devices, etc. Furthermore, the above-mentioned external memory is not limited to one piece, and at least two or more pieces of external memory may be provided. That is, the host computer 3000 may be configured to be able to connect itself with a plurality of optional font cards for providing additional fonts and external memory that stores a program for interpreting a printer control language of a different language system, in addition to internal fonts. Furthermore, the host computer 3000 may be configured to have NVRAM not shown in the figure and store printer mode setting information entered on the operational panel 1501.

Figure 6:
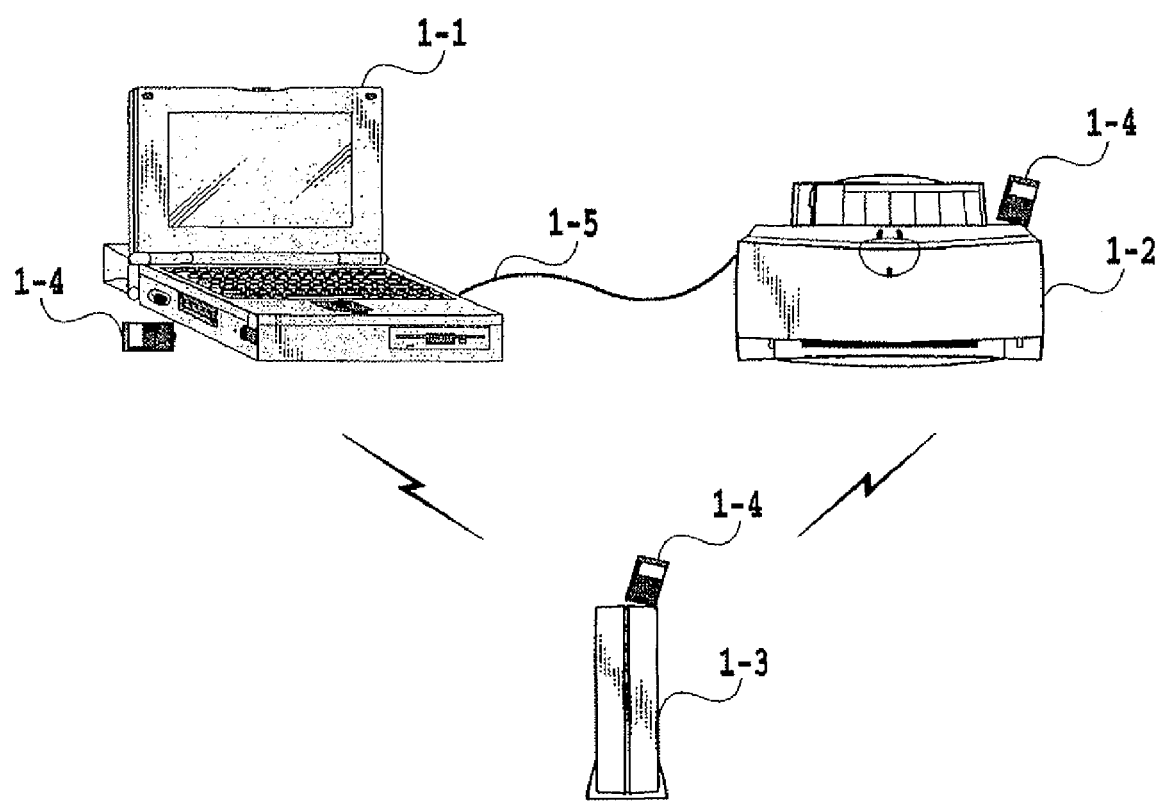
FIG. 6 is a view showing a schematic configuration of a printing system according to one embodiment of the present invention.

FIG. 6 shows a configuration of a printing system according to one embodiment of the present invention. In the figure, the note PC 1-1 has USB as a wired local interface and can be equipped with a wireless LAN card 1-4 of the PCMCIA card type as a wireless interface. The printer 1-2 is also equipped with both a wired local interface and a wireless interface, as with the PC 1-1. The wired local interface can make connection with the PC 1-1 using USB cable 1-5. As a wireless interface, a wireless LAN card 1-4 of the PCMCIA card type can be attached to the printer. The access point 1-3 is responsible for mediating wireless devices at an access point of a wireless interface. This can be equipped with a wireless LAN card 1-4 of a PCMCIA card type similarly.

The PC 1-1 functions as a host computer that controls printing on the printer 1-2. The PC 1-1 can conduct printing on the printer 1-2 using a wired local interface USB between the PC 1-1 and the printer 1-2, and can also transfer printing data to the printer 1-2 through an access point 1-3 using a wireless LAN interface. Although only one PC is shown in this figure, a plurality of PCs can be connected to a single access point, and the plurality of PCs share one printer to conduct printing as well.

The wireless LAN has a mode in which the wireless LAN can connect with a plurality of wireless LAN devices through an access point, the mode being called a infrastructure mode. In the infrastructure mode, the same ID as an ID (SSID) being set in an access point 1-3 is set up also in wireless LAN devices, whereby a plurality of the wireless LAN devices, each of which communicate through the access point 1-3, can constitute a LAN.

When using a printer 1-2 as a wireless LAN device, it is necessary to set up the printer 1-2 so that it can connect with the access point 1-3. In this embodiment, suppose a setting between the PC 1-1 and the access point 1-3 has already been done, and the PC 1-1 is in a state of being able to communicate with the access point 1-3. Further, suppose the printer 1-2 has not been set up for a wireless LAN, and the printer is in the infrastructure mode as an initial state and its ID has not been set up. As for printer not equipped with wireless LAN, generally printers that are connected to PCs to conduct printing are in the main stream. The printer 1-2 also has a USB port and can conduct printing as with normal printers.

In a method for controlling printing according to the present invention, the PC 1-1 is connected to a wirelesses LAN printer via USB, and the PC activates a wireless LAN setup utility (computer program). The setup utility searches a printer (the pertinent printer) in which communication with the PC 1-1 is established by scanning a port installed in the host. When the PC found the pertinent printer 1-2 during the above-mentioned search, the PC acquires MAC address information through the port. Then, if the PC detected the pertinent printer 1-2 having the same MAC address through different ports, the PC enumerates the wired port of the above-mentioned pertinent printer in the list of settable ports.

That is, when at least one wireless port and at least one wired port for the same printer 1-2 exist, the PC prioritizes a setup operation through a USB port (wired I/F), and presents it to the user as a settable port for the pertinent printer 1-2. Alternatively, the PC performs a setup operation automatically through the USB port.

In the following, installation of a printer driver using a USB and installation of a wireless LAN using a USB will be described in this embodiment.

Figure 7:
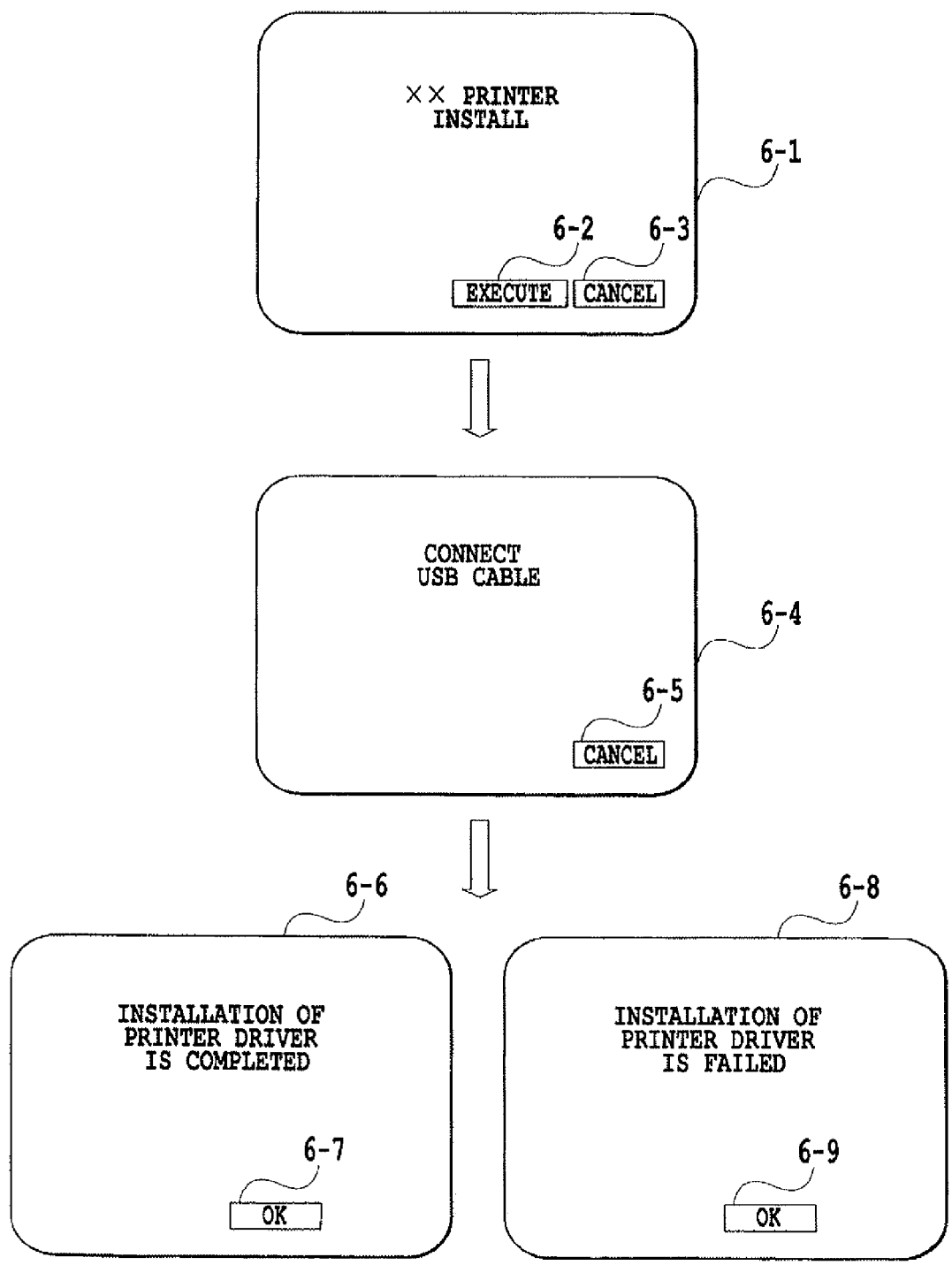
FIG. 7 is a view showing a screen of the installation procedure of a printer driver using a USB port.

FIG. 7 shows screen display that is shown on the screen of the PC, giving directions to the user in a procedure of installing software (printer driver) for enabling the application to operate a printing device on the PC 1-1 of FIG. 6. FIG. 7 shows a procedure of installation through the USB interface that is a common practice now. First, Screen 6-1 to start printer driver installation is displayed. This installation is started by the user activating software for installation. On Screen 6-1, there are displayed an "Execute" button 6-2 and a "Cancel" button 6-3 as selection icons used to select either execution or suspension. The user can select either icon with a mouse etc. Selection of the "Execute" button 6-2 starts the installation, and Screen 6-4 is displayed. The contents to be executed will be described referring to the flowchart of FIG. 8. If the "Cancel" button 6-3 is selected, the software ends without installing the printer driver.

On Screen 6-4, a message is displayed to prompt the user to connect a USB cable to the USB interface, and the user is expected to connect a USB cable to the USB interface of the printer according to the direction. If the printer is not powered, the user turns on the printer. Even on Screen 6-4, the user can suspend installation by clicking a "Cancel" button 6-5. When the printer is turned on after connection of USB cable, installation of the printer driver and internal setting of the printer is completed by Plug and Play. Installation of the printer driver by Plug and Play is performed by the procedure described above.

If the installation is successful, Screen 6-6 is displayed to complete the installation. Software is ended by selecting an "OK" button 6-7. When the installation of the printer driver is unsuccessful for any reason, Screen 6-8 is displayed to inform the user of failure of the installation. As with Screen 6-6, the user can end the installation with an "OK" button 6-9.

As described in the foregoing, by allowing the user to operate on screens, i.e., Screen 6-1→Screen 6-4→Screen 6-6, the installation of the printer driver using the USB interface is completed and printing via USB becomes possible. The installation of the printer driver using the USB port can be easily performed only by activating software and connecting cable.

Figure 8:
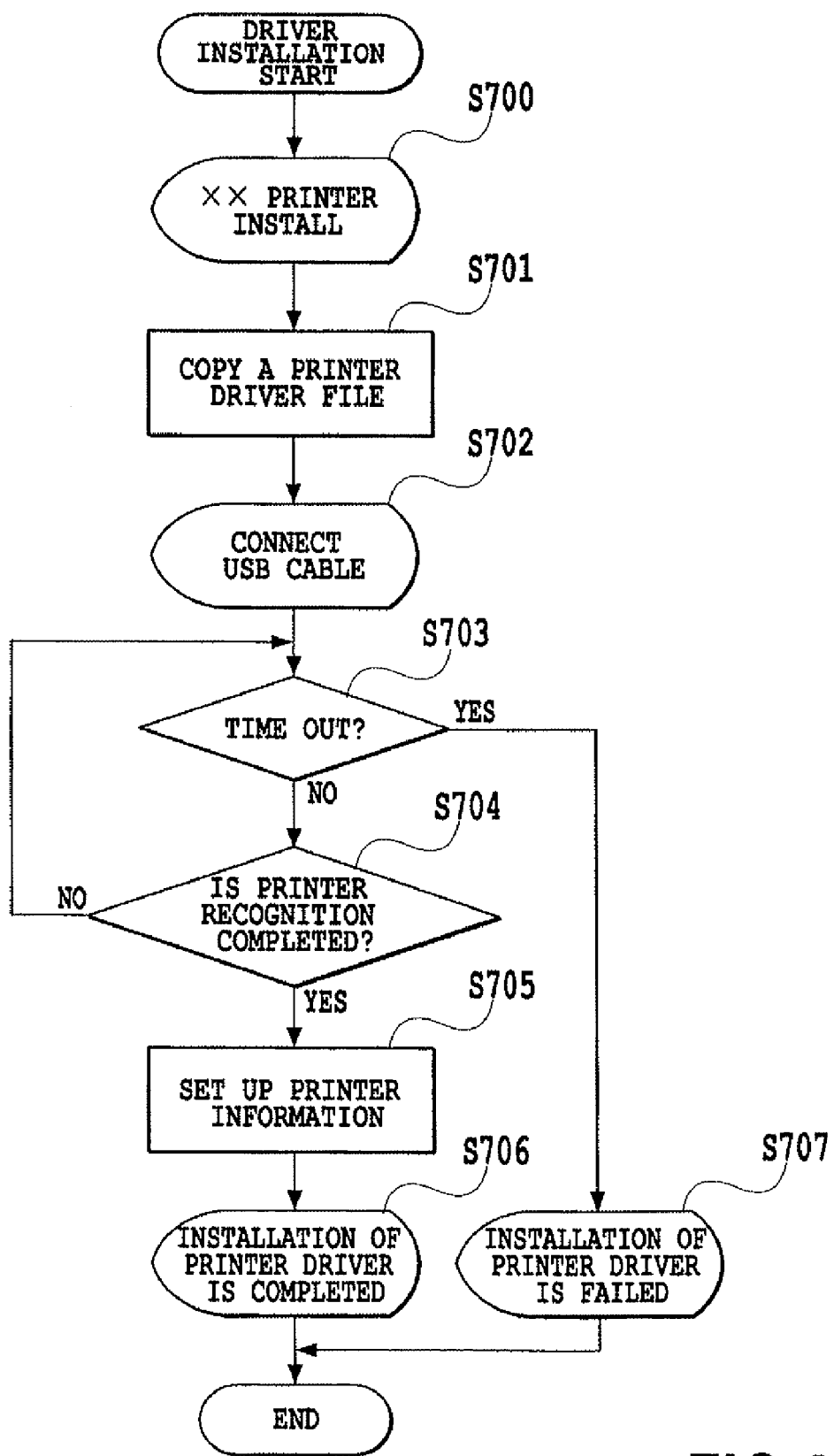
FIG. 8 is a view showing a flowchart of the installation of a printer driver using a USB port.

FIG. 8 is a flowchart for illustrating in detail the contents explained referring to Screen 6-1 of FIG. 7. First, a screen corresponding to Screen 6-1 of FIG. 7 is displayed (Step S700). When execution is selected on Screen 6-1, the flow proceeds to Step S701, at which a printer driver execution file is copied to the system. Generally, a location in the system where the printer driver execution file and an information file are allocated has been determined depending on an OS. The utility copies the printer driver execution file in advance according to this rule. As described above, the OS searches a proper driver in a predetermined storage location of information files of drivers, and registers and sets up the driver so that the OS can use the driver. In this process, files related to the printer driver are copied into a specified location so that these registration and setting are performed properly.

Next, Screen 6-4 of FIG. 7 is displayed (Step S702). After displaying this screen, the system confirms that connection through USB cable is done and the printer is turned on properly within a fixed time, and checks whether a fixed time has elapsed (Step S703). If it is not time-out, the flow proceeds to Step S704, at which the system checks whether detection of printers is completed. This is to confirm whether the printer is found properly. Description of the details was given at the installation procedure of printer driver described above. When time-out occurred at Step S703, Screen 6-8 indicating a failure of the installation is displayed (Step S707). When recognition of the printer by Plug and Play is completed at Step S704, the flow proceeds to Step S705, at which the system sets up the printer information (Step S705). Next, Screen 6-6 indicating that the installation finished normally is displayed (Step S706). The installation of the printer driver using the USB is completed now. This is to perform the installation of the printer driver via USB by the conventional method.

Figure 9:
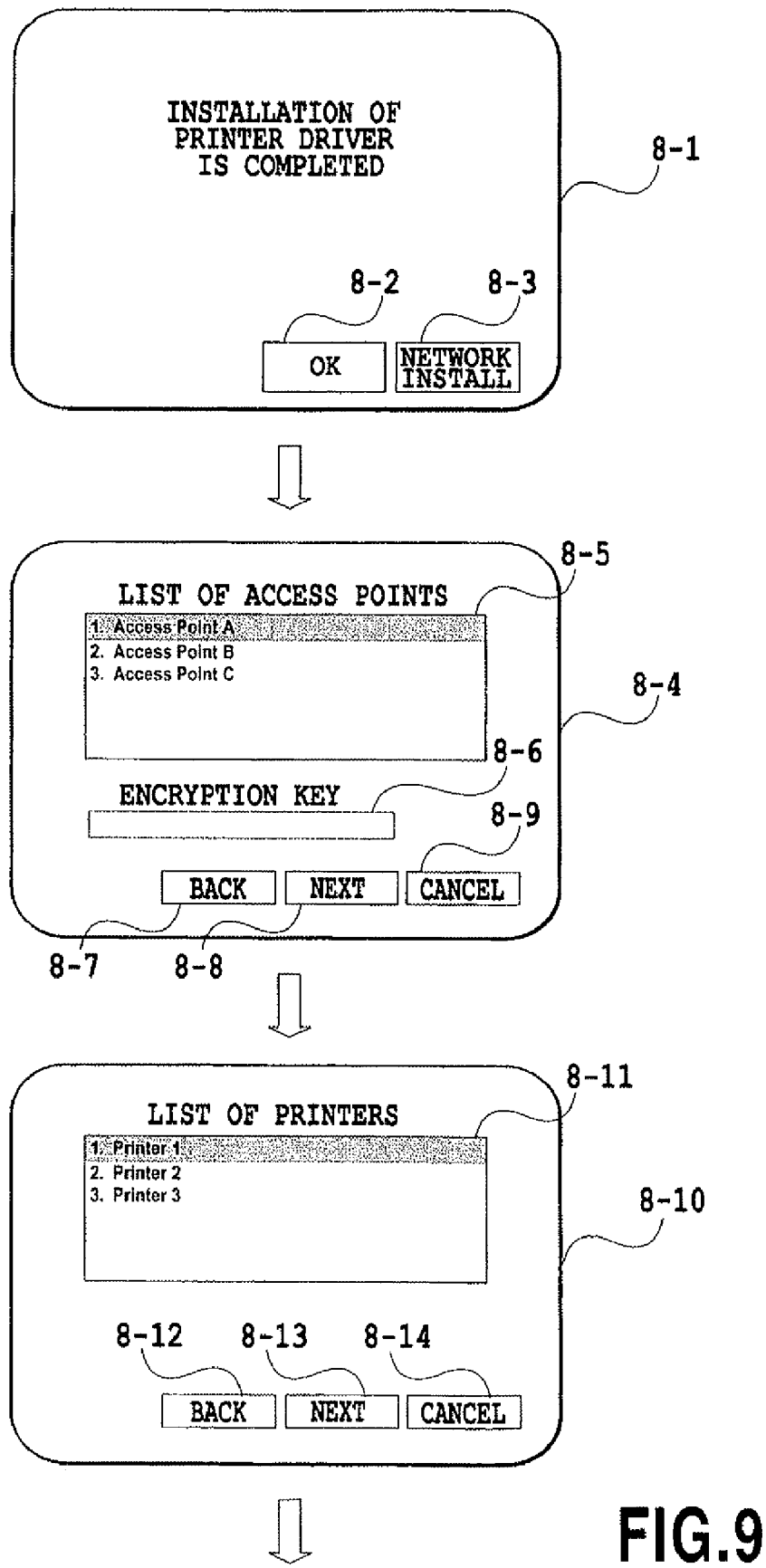
FIG. 9 is a view showing an example of the screen displayed in the installation procedure of a wireless network using a USB port.
Figure 10:
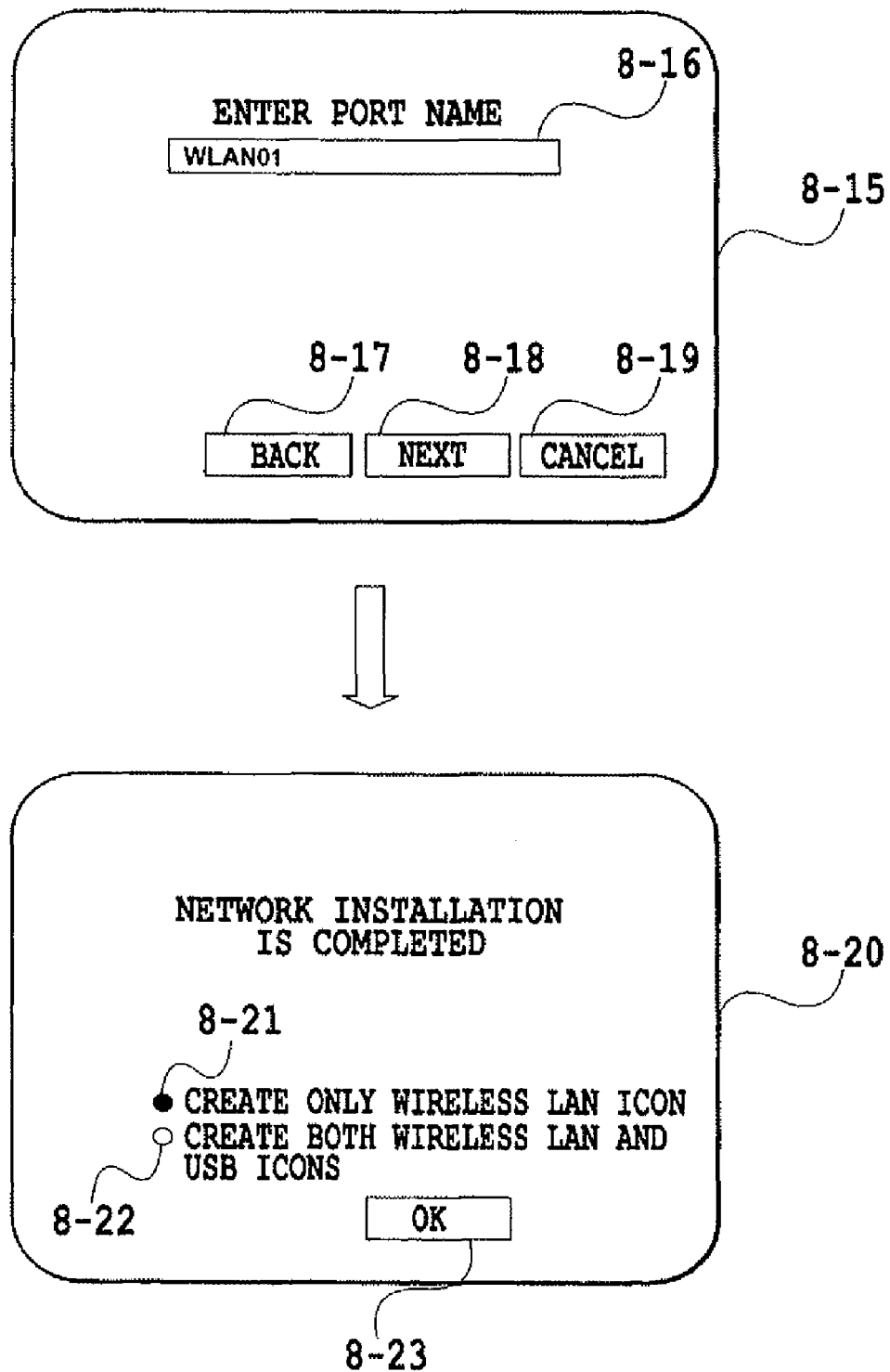
FIG. 10 is a view showing an example of the screen displayed in the installation procedure of a wireless network using a USB port.

FIG. 9 and FIG. 10 show a screen display for the case where installing the wireless LAN is installed following the completion of printer driver installation explained in FIGS. 7 and 8. In the case of installation only via USB, Screen 6-6 of FIG. 7 indicates the completion; in the case of FIG. 9, Screen 8-1 is displayed instead of Screen 6-6. That is, in the case of a printer having only a USB port, the procedure is completed on Screen 6-6 of FIG. 7; in the case of a printer having both USB and wireless LAN, Screen 8-1 is displayed instead of Screen 6-6. If the user selects an "OK" button 8-2 on Screen 8-1, the installation is completed here and wireless LAN will not be installed.

When the user selects a "Network install" button 8-3 on Screen 8-1, Screen 8-1 is switched to Network Install Screen 8-4. First, this process starts from an operation of selecting an access point in order to connect with it. In order to display a list of access points that are found in printers, a command for searching access points is sent via USB using a wireless LAN card attached to the printer, and information of access points obtained thereby is acquired via USB. Screen 8-4 shows a state where the list of access points is displayed.

First, a list box 8-5 is a portion showing the list of access points found from the printer. This example shows that three access points A, B, and C are found from the printer. Since the list shows all access points working in a range that a radio wave can covers, access point shown there are not necessarily limited to access points that the user is using. In order to allow the user to select a desired access point among a plurality of access points, the user can move a high-lighted row in the list box 8-5, and thereby can select each access point.

If the selected access point is encrypted, the user can enter an encryption key for decrypting the encryption into the input area 8-5; therefore, the utility can support encrypted access points. Generally, encryption technology is adopted in wireless LANs in order to prevent tapping and leakage of data. One of typical technologies is WEP (Wired Equivalent Privacy). This is a symmetrical algorithm in which information called a key for encryption is used for encryption and decryption similarly. Setting of this key realizes concealment of data from other devices. In the case where a wireless LAN is being used in an encrypted environment, it is necessary to set up the same encryption key also on the printer. Selection of a "Return" button 8-7 on Screen 8-4 can put back the user to the previous screen 8-1. By selecting a "Next" button 8-8, the user can proceed to the next with specifying the access point selected in the list box 8-5. The user can suspend installation by clicking "Cancel" button 8-9. Since the user can select and specify the access point that the user is using currently on Screen 8-4, erroneous connection to other access point can be prevented.

Next, once the user specified connection of the printer through the access point specified on Screen 8-4, a wireless LAN access point of the printer is set up and the printer becomes recognizable from the access point. In order to check whether the printer is connected properly, the printer is searched via wireless LAN. The details will be described referring to the flowchart of FIG. 12.

Screen 8-10 is a screen displaying a list of printers found through the access point. The listing of printers is prepared by receiving answers from printers that received a printer search command sent from wireless LAN of the PC through the access point. The search command is broadcast to all devices on the network by broadcasting, and every device that received the search command and can understand this command (in this case, a specific printer and printer adapter) returns predetermined information in response to the command to the host having sent the command. This information includes name, ID, address, etc. of the printer. The host can specify a printer that the host intends to connect with based on these pieces of information. A list of the printers found is displayed in the list box 8-11 on Screen 8-10. In this example, three printers, i.e., printer 1, 2, and 3 are found. As with the selection of an access point, the user can select a printer that is highlighted. Selection of a "Return" button 8-12 on Screen 8-10 leads the user to the previous screen 8-14; selection of a "Next" button 8-13 allows the user to determine a printer selected in the list box 8-11 as a target connected printer. Selection of a "Cancel" button 8-14 allows the user to suspend the installation. When the "Next" button 8-13 is selected on Screen 8-10, a screen 8-15 in FIG. 10 on which a port name is entered is displayed, and the user can enter a port name that the user intends to enter into an input area 8-16.

The port name is used to capacitate a single PC to distinguish a plurality of printers having the same function (e.g., wireless LAN). In this case, WLAN01 is set up as an initial value. WLAN is an identifier to indicate a printer of a wireless LAN, and 01 represents a last number registered in the system. In order to handle a plurality of printers having the same function distinctively, the printers are given numbers in order. Generally, the printer driver uses this port name to designate a printer to be used for printing by specifying it. Selection of a "Return" button 8-17 on Screen 8-15 takes the user to the previous Screen 8-10. Selection of a "Next" button 8-18 allows the user to fix a port name entered into the input area 8-16. The user can suspend the installation with a "Cancel" button 8-19.

Selection of the "Next" button 8-18 on Screen 8-15 leads to display of Screen 8-20 of FIG. 10, indicating that network installation is completed. This screen has two choices. The user can select either an option button 8-21 for the case where only a printer icon of the wireless LAN is created or an option button 8-22 for the case where two icons of the wireless LAN and the USB port are created. Selection of the option button can be changed with a mouse etc. In the figure, an item denoted by a symbol • is an item presently selected. Selection of an "OK" button 8-23 leads to creation of a printer icon according to selected option, either of the option buttons 8-21 or 8-22. The printer icon is used to allow the user to confirm or distinguish printers currently registered or to identify printers that can made ready currently. In printing in the application, the user is expected to select this icon.

Figure 11:
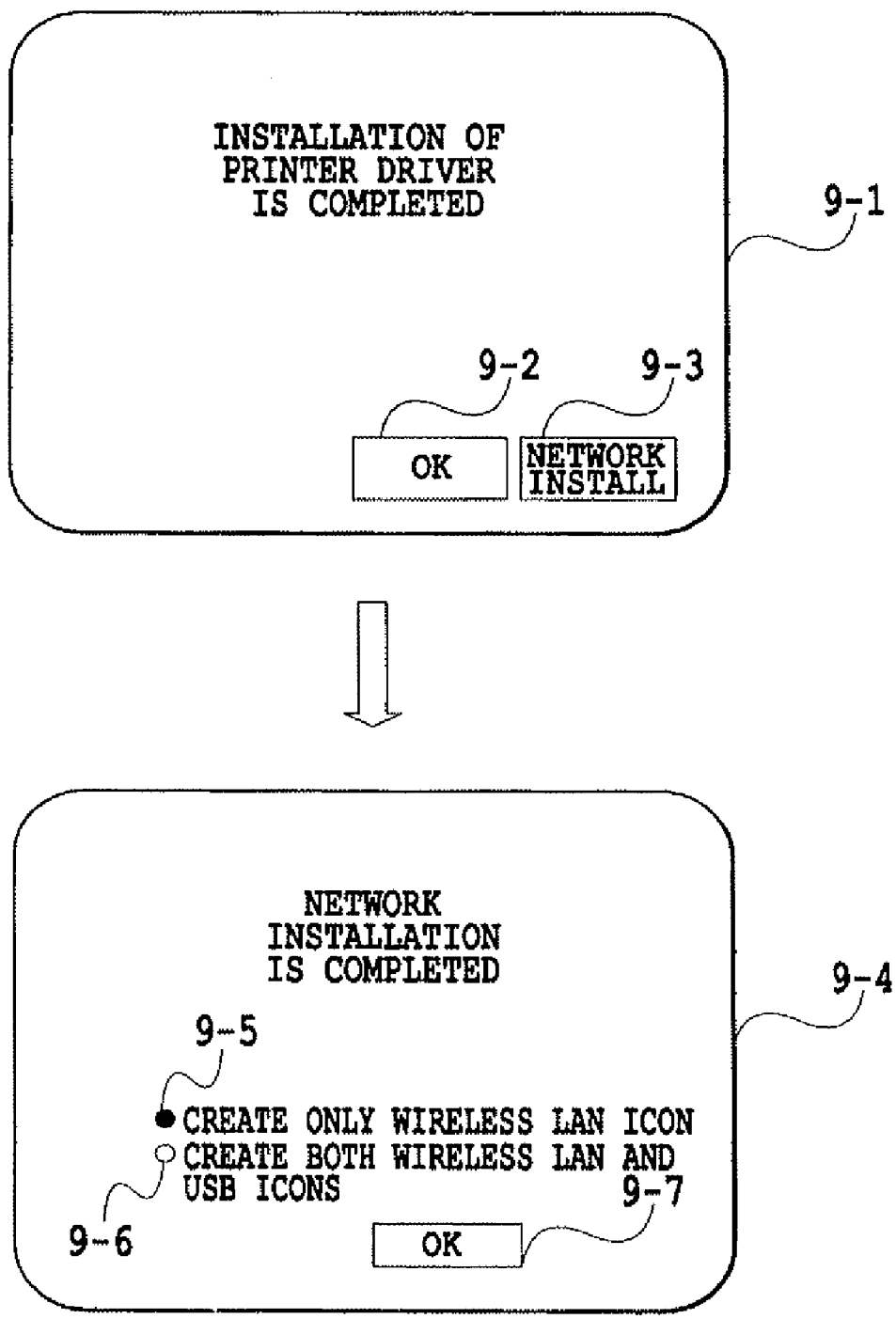
FIG. 11 is a view showing an example of the screen displayed in the installation procedure of a wireless network using a USB port.

FIG. 11 shows a change on a screen in the case where only one access point is found in installing a network described as to FIG. 9, only one printer is found, and an input screen of the port name being omitted. In this case, processing concerning Screens 8-4 and 8-10 of FIG. 9 and Screen 8-15 of FIG. 10 are omitted, and only Screen 9-1 corresponding to Screen 8-1 and Screen 9-4 corresponding to Screen 8-20 are displayed. Since except for processing of display of Screens 8-4, 8-10, and 8-15 operations are the same as described above, explanation of each item displayed in FIG. 11 is omitted. Since part of processing whose display is omitted is the same operation as described above, its explanation is omitted. That is, in the case where only one printer exists at one access point and the port name may be created automatically, the user can complete the installation of a wireless network only by executing two directions: the "Network install" button 9-3 that is a selection icon on Screen 9-1 of FIG. 11, and the "OK" button 9-7 on Screen 9-4, the completion screen. The details will be described referring to the flowchart of FIG. 12.

Figure 12:
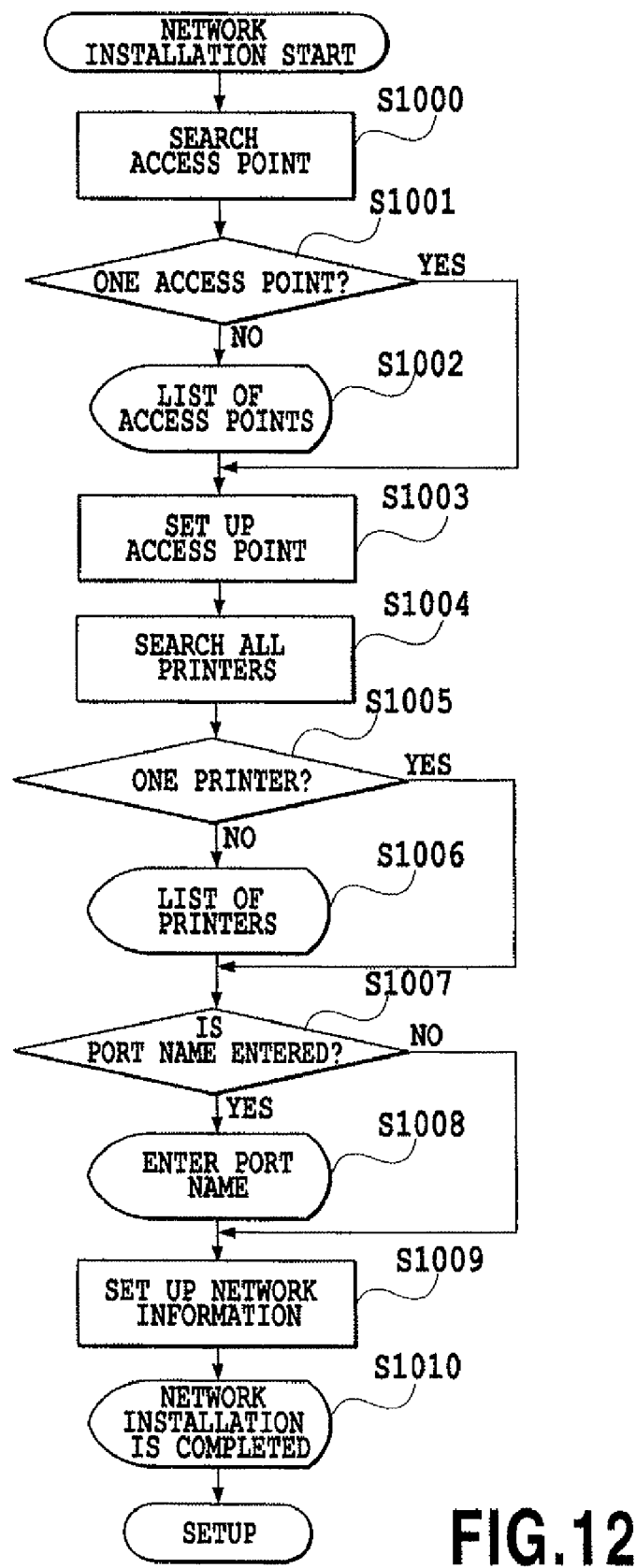
FIG. 12 is a view showing an example of the screen displayed in the installation procedure of a wireless network using a USB port.

FIG. 12 is the flowchart illustrating in detail the processing pertinent to display of screens shown in FIGS. 9 and 10. The PC searches access points and takes in information of found access points via USB (Step S1000). To search access points, the PC transmits an access point search command to printers via USB. For commands sent via USB for wireless LAN installation, the three commands shown in FIG. 13 are prepared. By sending the access point search command among the commands to the printer, the printer uses a wireless LAN module to establish a setting for access point search on the wireless LAN module. The wireless LAN module on which the setting for the access point search is set up transmits a signal of access point search. Any access point that received this signal sends back information on its own access point (ID, radio wave conditions, address, channel, etc.) to the sending party. The wireless LAN module receives the information sent back from the access point, and the printer transfers the received information to the PC. At this time, the printer sends back information on all the access points that have been found to the PC.

Next, the PC checks how many access points are found from the information sent back from the printer at Step S1001. When a plurality of access points is found, the flow proceeds to Step S1002, at which Screen 8-4 of the list of access points is displayed, and the user is requested to select an access point. When only one access point is found, the flow proceeds to Step S1003, skipping Step S1002. Next, an access point is set up at Step S1003. This is done by sending an information setting command, shown in FIG. 13, based on the information of the access points found at Step S1000 via USB. The information setting command is used to set up necessary information to use an access point, such as address of the access point and an encryption key, which makes it possible to connect the printer to a specific access point.

Next, at Step S1004 the PC searches printers using a command of the network. This is shown in FIG. 14; two commands are prepared as commands for network installation. They are both search commands one is a printer search command (broadcasting) that does not specify a printer; and the other is a printer search command (addressing) that specifies a specific printer. Here, the broadcasting type search command is transmitted. This is sent onto the wireless LAN, and the printer received this command from the wireless LAN sends back information of the printer (ID, name, address, model name, etc.) to the PC that transmitted the command. Since this command is transmitted by broadcasting, there is the possibility that all printers that can understand this command may reply to this command. Based on the information sent back from the printer, it is necessary for the PC to select a model that the PC intends to install.

For this purpose, the PC checks whether the number of printers is one from the information sent back from the printers (Step S1005). When a plurality of printers are found, the flow proceeds to Step S1006, at which Screen 8-10 containing the list of printers is displayed, to make the user select a printer. If the found printer is one, the flow proceeds to Step S1007, skipping Step S1006. The PC checks whether it is necessary to display the port name at Step S1007. If necessary, the flow proceeds to Step S1007, at which the PC displays Input Screen 8-15 of the port name to make the user enter it. If input of a port name is unnecessary, the flow proceeds to Step S1009, skipping Step S1008. Whether the user is requested to enter a port name can be determined, if desired, based on whether installation software may be constructed according to the determination or not. In the case where the installation is realized with simpler and fewer screens, the user can select an option to omit the entering. At Step S1009, network information is set up, so that the wireless LAN becomes available. The network information indicates information needed for printing, such as address and name of the printer. Next, a network installation completion screen is displayed (Step S1010). A method for creating an icon will be described later.

FIG. 13 shows commands for installation to be sent to the printer via USB. In this embodiment, three commands are prepared. In addition to these commands, there is a command to send printing data, a command to set several kinds of printers, etc. However, only install commands directly related to this embodiment are enumerated. The first one is a command to search access points, which was explained at Step S1000 of FIG. 12. The second one is an information acquisition command for acquiring information about the wireless LAN being set up on the printer therefrom. The third one is an information setting command for setting up information about the wireless LAN to be set up on the printer, for example, address, mode, channel, etc. of an access point. This is the command used at Step S1003 of FIG. 12 to specify an access point.

FIG. 14 shows commands, among network commands, used for installation. They are sent to the printer via wireless LAN. Two commands are prepared. In addition to these commands, there is a command to set several kinds of printers etc. However, only install commands directly related to this embodiment are enumerated. Both of the two commands are commands for printer search; there are prepared one that all printers receive (broadcasting) and one that a specific printer receives (addressing). By using these commands, the user can judge whether a printer or printers existing on the network are found and set up properly. These commands are transferred and replied to using a protocol common on the network, such as TCP/IP and UDP.

Figure 15:
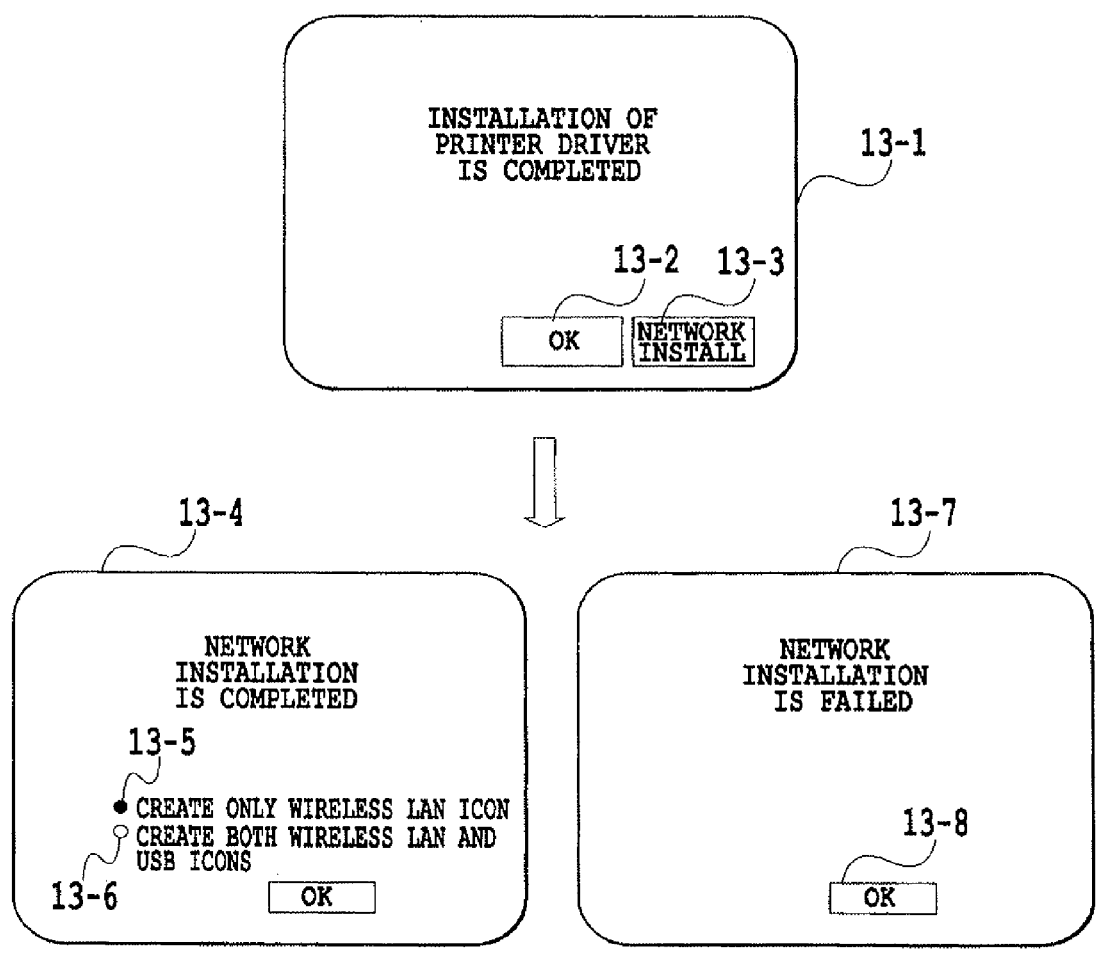
FIG. 15 is a view showing an example of the screen displayed in the installation procedure of a wireless network in a PC using a USB port.

After performing printer driver installation onto the PC, which was explained up to FIG. 14, and completing a wireless LAN setting of the printer, a printer driver is installed onto another PC (in which neither the printer driver nor network is installed). FIG. 15 shows an installation screen for this. Since the setup of the wireless LAN at the printer side is completed, the wireless LAN will be set up only at the PC side. Since installation of the printer driver is the same as was explained in FIGS. 7 and 8, its explanation is omitted. When Screen 13-1 after the completion of printer driver installation is displayed and the network installation is being performed, the user selects a "Network install" button 13-3. After the selection, Network Installation Completion Screen 13-4 or Network Installation Failure Screen 13-7 is displayed. Since the contents of Screen 13-4 are the same as those of Screen 9-4, its explanation is omitted. Network installation failure screen 13-7 is displayed when the connected printer could not be found by the wireless LAN for any reason.

Figure 16:
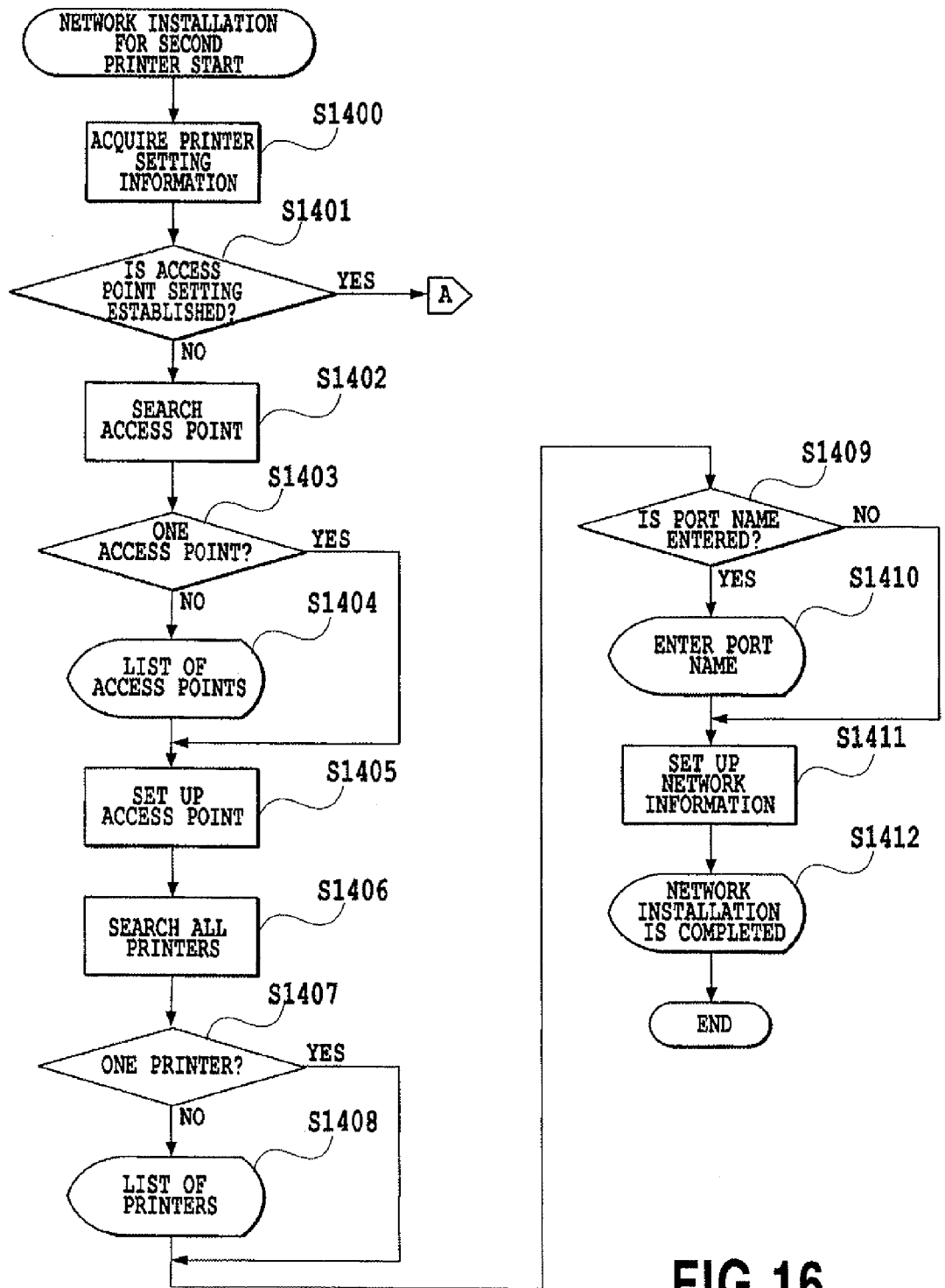
FIG. 16 is a flowchart showing an example of the installation procedure of a wireless network in a PC using a USB port.
Figure 17:
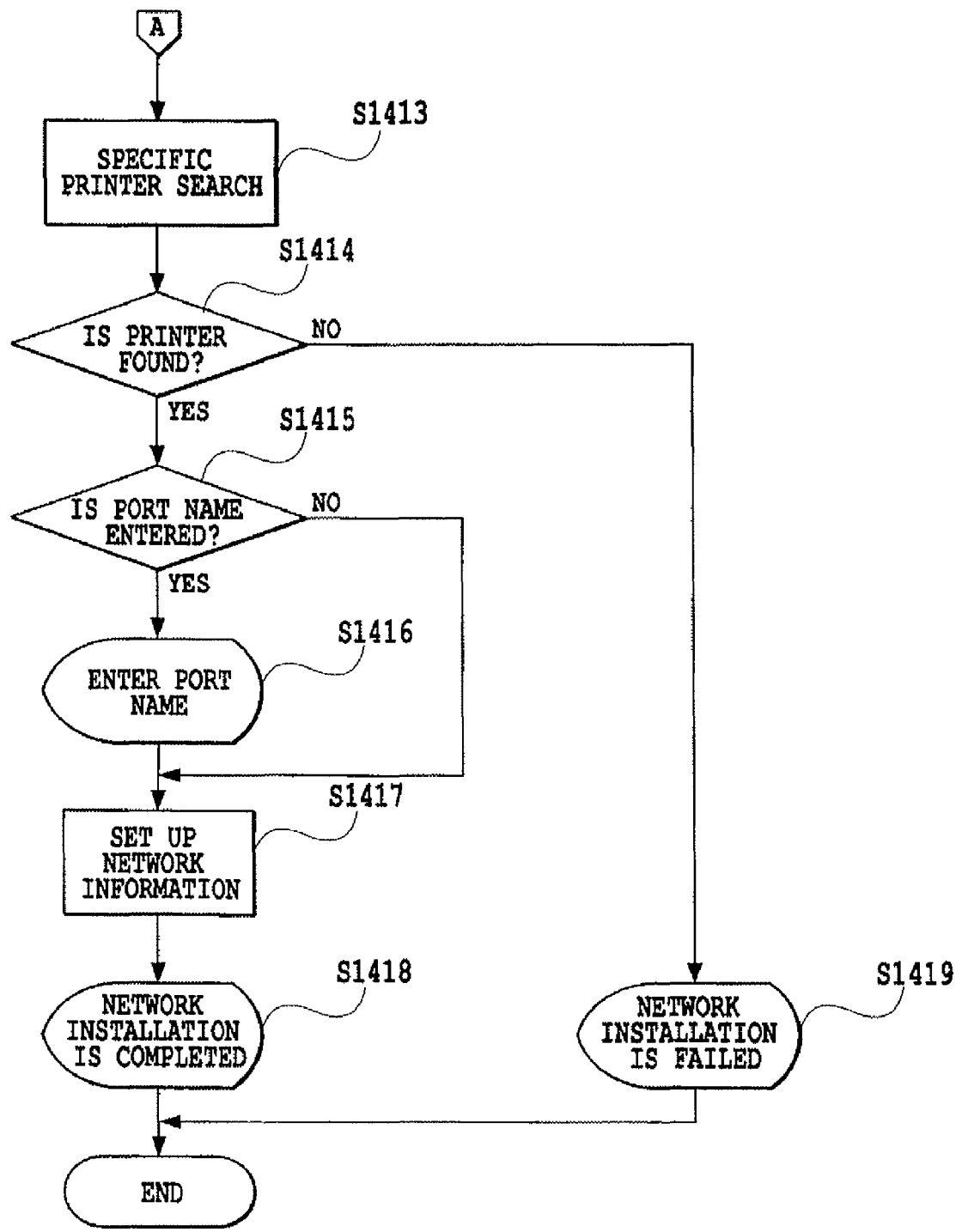
FIG. 17 is a flowchart showing an example of the installation procedure of a wireless network in a PC using a USB port.

FIGS. 16 and 17 show a detailed flowchart for the case where the network installation explained in FIG. 15 is performed on the second and subsequent PCs. First, the setting information on the printer is acquired at Step S1400 of FIG. 16. This is done by sending the information acquisition command shown in FIG. 13 to the printer via USB, and the printer send backs information being set up to the PC via USB. The information being set in the printer includes information about the wireless LAN, which contains information as to whether the access point is set up. The setting of the access point is one that is set up after installation of the printer driver onto the first PC, namely, at Step S1003 of FIG. 12. If the access point is already set up, it is not necessary to set up an access point anew and information that is already set up can be used. At Step S1401, whether an access point is already set up is checked with information from the printer. The case where the access point is not set up means the case where this PC is the first PC. In this case, it is necessary to start with access point setup; it is necessary to execute processing shown in FIGS. 9, 10, and 11. Both an access point setup operation of the printer and a network setup operation on the PC side are performed at Steps S1402-S1412. Since they are the same as those in Steps S1000-S1010 of FIG. 12, their explanation is omitted.

If it is judged that the access point is already set up at Step S1401, the flow proceeds to Step S1413 of FIG. 17, at which searching of a specific printer is conducted. The information obtained from the printer at Step S1400 includes an address and an ID of the printer that is already set up. Based on this information, the PC sends a printer search command (addressing) shown in FIG. 14 onto the wireless LAN. A setting between this second PC and the access point is assumed to be completed, and consequently the PC can issue a command onto the wireless LAN. Since this command is a search command for specifying an address, it arrives only at the printer that is currently being installed by connection via USB. Any printer at which this command arrived sends back the information of the printer to the PC having sent the command via wireless LAN. The PC side checks arrival of an answer from the printer and rightness of the arrived information (Step S1414). If the information from the printer is sent back from the printer via wireless LAN and the information agrees with information obtained via USB after comparison, it can be confirmed that a desired printer is found properly. In the case where no information from the printer is sent back for any reason or in the case where the two pieces of information do not agree with each other, the flow proceeds to Step S1419, at which the network installation failure screen is displayed. If the printer is found properly at Step S1414, the flow proceeds to Step S1415. Since Steps S1415-S1418 are the same processing as those of Steps S1409-S1412, their explanation is omitted. By processing at these steps, wireless LAN installation onto the second PC is completed, allowing the PC to conduct printing on the wireless LAN. The flowchart shown in FIGS. 16 and 17 is constructed so that the wireless LAN and the printer can be also set up in the second and subsequent PCs in addition to the setup of the wireless LAN and the printer in the first PC.

According to the procedure described above, it becomes possible to perform a setup operation whereby the PC uses a printer having two communication interfaces, USB and wireless LAN. By establishing communication between the PC and the printer through the USB interface, it becomes possible to perform a setup operation so that the user can use the printer via wireless LAN. Consequently, this creates two ports as paths therethrough the PC communicate with the pertinent printer: a port instance of USB, and a port instance of the wireless LAN.

<Network Setup Application>

In this embodiment, a wireless network setup utility application (wireless LAN setting utility) is installed onto the PC in the course of wireless LAN installation of the printer.

This application is a computer program that the user activates after the installation. By this application, the user can change the setting of the wireless LAN and the network for the pertinent wireless LAN printer that is already installed. The setting change is done by the PC sending the contents of the setting specified by the application to the printer by communication through the port instance of the printer that is set up at the time of installation. FIG. 18 shows the command to be sent to the printer to set up a network, and six commands are prepared in this embodiment.

Figure 19:
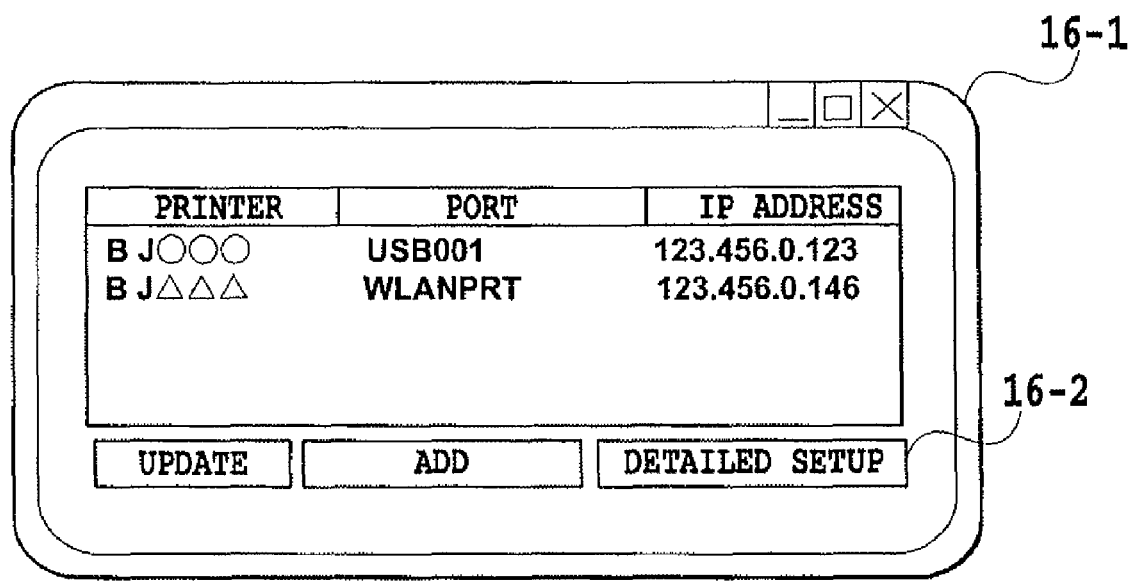
FIG. 19 is a view showing one example of a window that a network setting application in this embodiment displays.

FIG. 19 shows a window when this application is activated. As shown in the figure, the initial window displays a list of ports to which settable printers are connected. After selecting a printer that is to be set up, the user can call a screen of setting the selected printer by pressing a "Detailed setup" button 16-2

Figure 20:
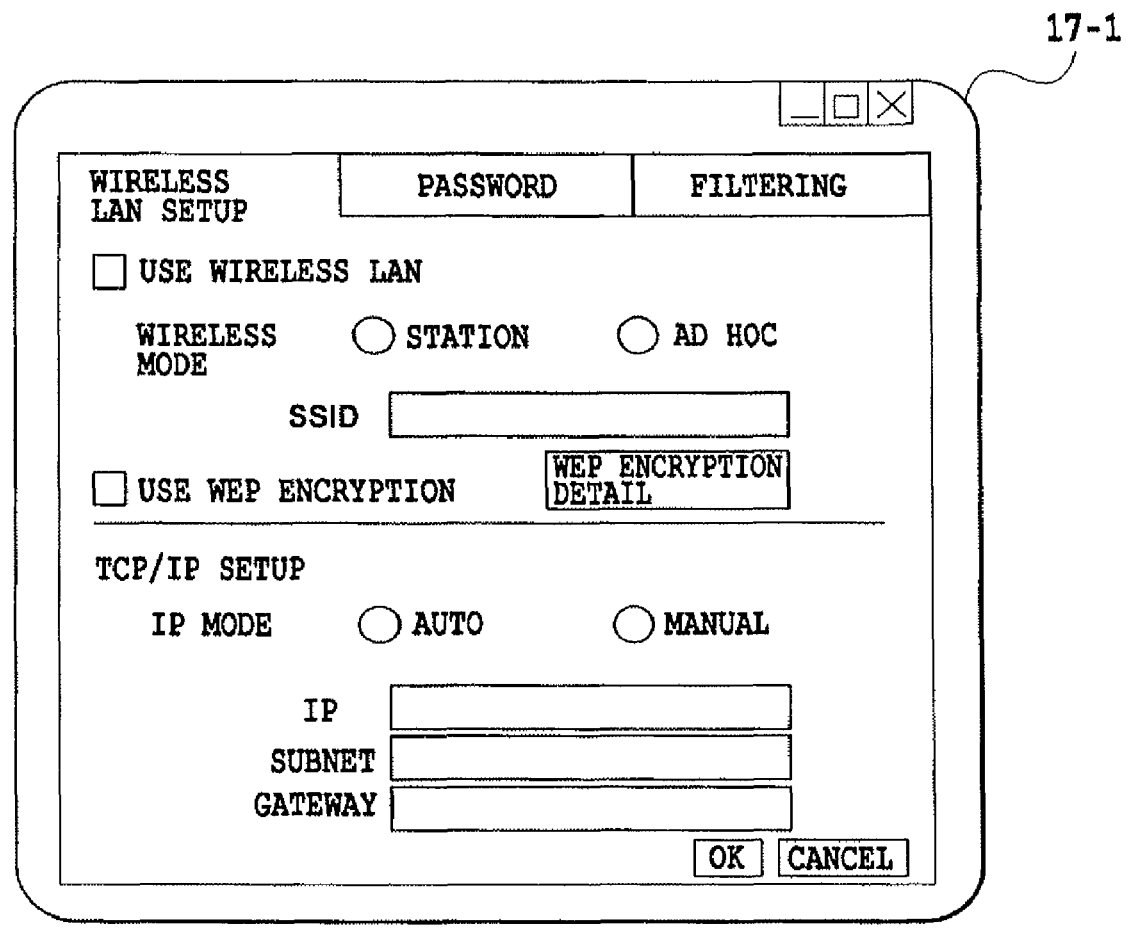
FIG. 20 is a view showing one example of wireless LAN related items in a detailed setup window in the network setting application.
Figure 21:
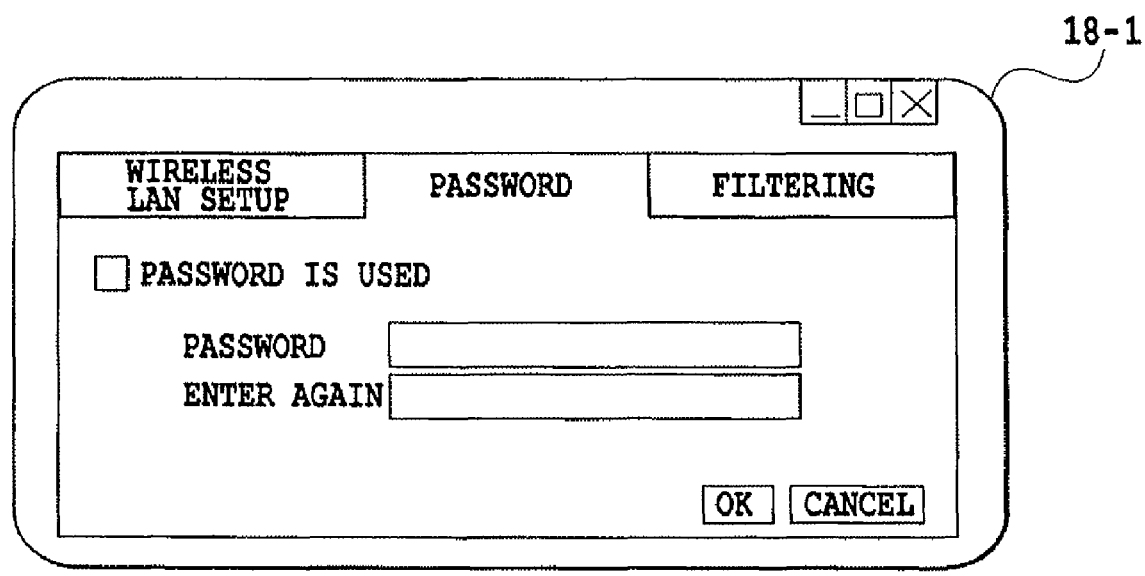
FIG. 21 is a view showing one example of management-password related items in the detailed setup window in the network setting application.
Figure 22:
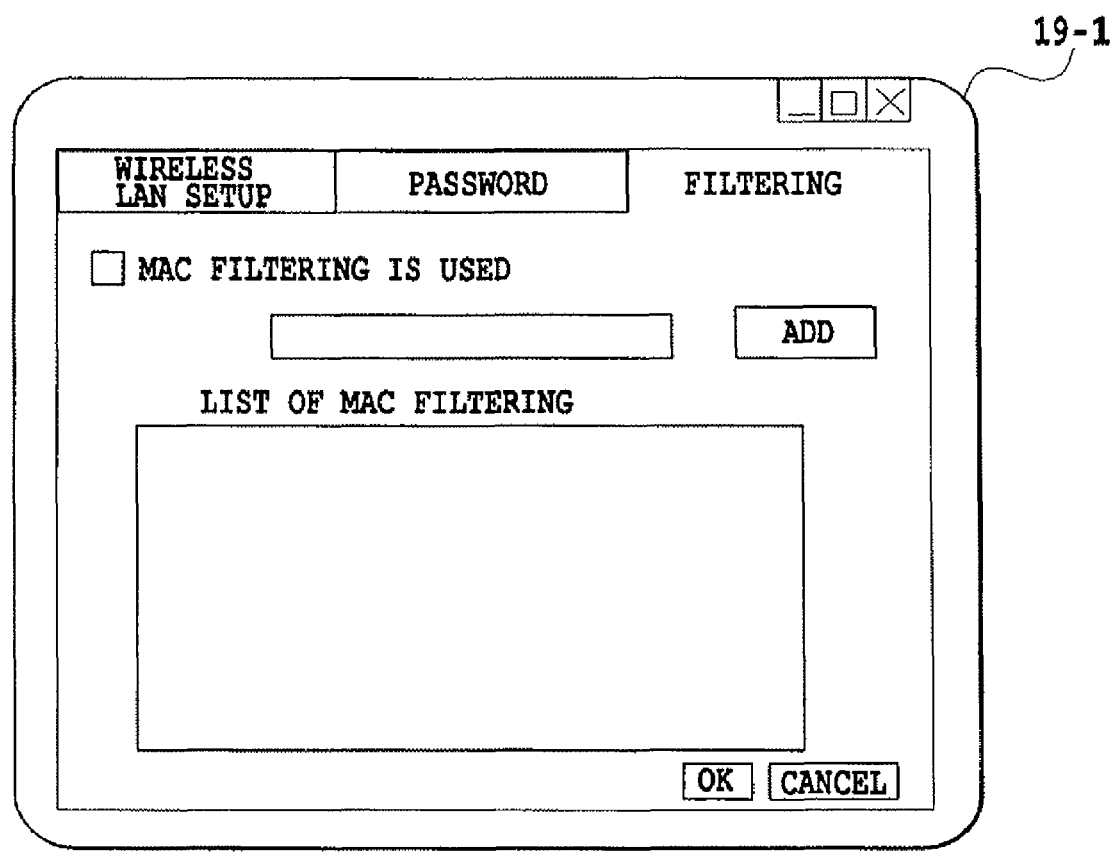
FIG. 22 is a view showing one example of access restriction related items in the detailed setup window in the network setting application.

FIGS. 20 though 22 show a detailed setup window.

The detailed setup screen is organized into large entries using tabs. The user can move among the tabs by clicking a title part of the tab and make a change in the setting for each item.

In each tab, one of these items and the contents of its detailed setup are displayed. In this content, settable items that correspond to the network configuration of the printer are displayed.

When a "Detailed setup" button 16-2 of FIG. 19 is pressed, the application issues a command to a network control part of the said printer through the selected port according to a predetermined communication procedure, and thereby acquires and sets up several kinds of information.

At the time of displaying the detailed setup, the application issues first a settable value acquisition command and acquires information on a network configuration, settable items, and the settable values of the network control part of the printer with which the application is communicating. Thereby, the application judges tabs (large item) to be displayed and items to be defined settable in each tab.

Next, the application issues a current value acquisition command to the printer, inquiring what is a current setting value for each settable item. A network controller having received the command answers the current setting value.

In the case of the printer of this embodiment, the following settable items are displayed on the detailed setup screen.

Wireless LAN Related Items
Selection of service condition (used/unused) of wireless LAN
    Operation mode of wireless LAN (infrastructure/ad hoc)
    Acquisition method (automated/manual) of IP address
    IP address
    Subnet mask
    Default gateway
    Management Password
    Selection of usage state (used/unused) of management password
    Management password input
    Access Restriction (Filtering)
    Selection of usage state (used/unused) of access restriction
    MAC address on which access restriction is imposed The above wireless LAN related items, management password, and access restriction are specified as large items. They serve as tub headings, being displayed as Windows 17-1, 18-1, and 19-1 shown in FIGS. 20, 21, and 22, respectively.

According to each setting item, a set of radio buttons for selecting a choice in the setting or an edit box into which a value can be directly entered is prepared. The current values that are set up in the printer are reflected in choices of each item and the edit box for display.

For an item that the user intends to change, the user selects a choice or enters a change value and subsequently press the "OK" button and thus a setting change is reflected in the printer.

When "OK" is pressed, the application compares a current value acquired from the printer with the contents of the setting as a result of a setting change made by the user. Then the printer sends difference between these values, namely the contents of the setting that are changed, to the printer by issuing thereto a setting value write command, thus completing the change in the contents of the setting to the network control part of the printer.

Next, a method for displaying settable printers on the initial window of the application according to the present invention will be described.

On the initial window, there are listed such communicable ports each of which is connected to a settable printer using this utility and is active at the time of activating the application, that is, making communication possible. A judgment of whether a settable printer is connected is made by actually communicating with the pertinent port. The application issues a DeviceID acquisition command for inquiring a DeviceID in which device information of the printer is described from the PC. The PC designates port instances to which printers satisfying the following conditions are connected as initial candidates.

Responsive to the Command

Tagged with an ID indicating that the printer is capable of communicating with the PC by the network setting command used in this application as a result of analyzing the acquired DeviceID information The application makes the above-mentioned judgment to all port instances for printers installed onto the PC. If a plurality of the pertinent printers are connected to the PC, they are detected.

In order to set up the wireless LAN, any printer according to this embodiment is connected to the host computer via USB, and thereby a USB port instance is created. At the same time, a port instance of the wireless LAN is is created as a result of the setup operation naturally. In the case where this printer is connected to the PC through both the USB port and the wireless LAN, these two port instances become active and are responsive to the above-mentioned DeviceID acquisition command. Therefore, both of the USB port instance and the wireless LAN port instance become candidates for the list.

Next, processing in the case where the detected port instances belong to the identical printer having a plurality of communication interfaces will be described.

In the case where all port instances each capable of performing communication for setting are enumerated, it is difficult for the user to distinguish which ports belong to the identical printer for which a plurality of port instances exist. Moreover, even when the user can distinguish ports of the identical printer, it is difficult for the user to judge which port instance can be used without affecting communication due to a change of the setting.

For example, in changing the setting of a wireless interface, there is the possibility that when a change is made through the wireless interface to be set up to change, the user will be unable to communicate therethrough depending on the contents of the change. In such a case, the user becomes unable to make a successive setting change and confirmation of the communication state; therefore, it is necessary to eliminate such a negative effect. On the other hand, if a change like this is made through a communication interface different from the communication interface whose setting the user intends to change, a communication path in use is not affected and consequently communication interruption resulting from a change does not occur.

This application has means for specifying a plurality of port instance for the identical printer and selecting a port instance suitable to setup communication among port instances of the identical printer.

When judging whether a settable printer is connected, the application issues the DeviceID acquisition command to the printer port detected by the OS. If the application judged that the printer port could be communicated by a network setting command that the application support (being an active port), the application issues a network interface card (NIC) information acquisition command based on the network setting command to that port.

This command is a command for inquiring of basic network information of the pertinent NIC. As its response, the application can acquire: the type of a network interface that the NIC is equipped with, a MAC address that is an inherent physical address given to each communication interface, and current IP address information. The use of this command enables the application to correlate the pertinent port and MAC address information of the connected printer NIC. In addition, since the MAC address is a non-redundant and unique number given to a device by a device manufacturer for management purposes and as a result the world's only unique address is assigned to the device, the use of this MAC address makes it possible to specify a printer uniquely.

As described above, the application issues an (NIC) information acquisition command for a detected port instance that makes communication possible by the network setting command. Thereby, the application acquires information of the network MAC addresses of the printers that the application can communicate with through respective ports. Then, as a result of acquiring MAC address information similarly for a plurality of ports, there is a case where the same MAC address information is acquired in spite of communication to different ports. This is exactly that the port is a different logical communication port for the identical printer.

Here, when a plurality of logical communication ports each of which makes possible communication for network setup are found on the identical printer, and if all targeted logical communication ports are presented, the user is at a loss about which port the user should select. It will be sufficient to present the user one of the ports as a choice. Moreover, if a logical communication port is presented along with logical communication ports of other printers in the same line, it becomes hard for the user to understand which logical communication ports belong to the identical printer, and causes confusion.

Then, when the application detects a plurality of logical communication ports for the identical printer, it presents only one typical port among the ports in the list of settable ports of the application.

Figure 23:
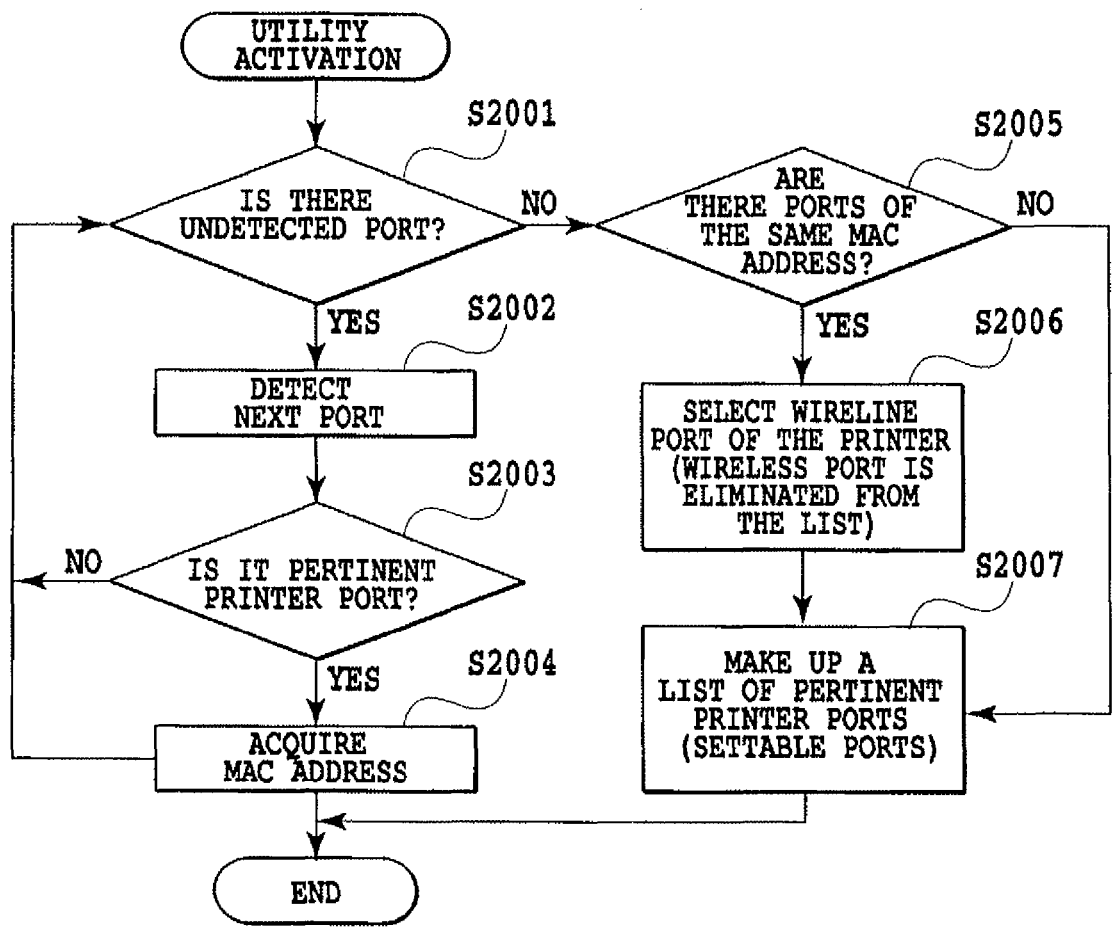
FIG. 23 is a flowchart showing one example of settable port selection processing in the network setting application.

FIG. 23 shows a flow covering from the port detection, including detection of ports for the identical device, to the preparation of a list of settable ports.

The printer installed in this embodiment has a USB port and a wireless LAN port. In this printer, the network setting can be done through either of the above communication interfaces, that is, through either the USB logical communication port or the wireless network port.

Here, in changing the setting of a wireless LAN or changing the setting of a network, there is a case where, when the change is performed through the communication interface or network whose setting the user intends to change, the user will be unable to communicate therethrough depending on the contents of the change. In this case, the user will be unable to perform consecutive setting change and confirm a communication state. For example, in the host PC and this printer that communicate with each other via wireless LAN with WEP, which is currently one of encrypting methods of wireless LANs, being set invalid, suppose the WEP of the printer side is set valid by setting through the wireless logical communication port. In this case, since wireless LAN communication will be interrupted unless a wireless LAN setting of the host PC side is changed similarly thereafter, subsequent setup operation cannot be continued.

On the other hand, if the above-mentioned setting change is done through an interface (e.g., USB in this embodiment) different from the communication interface whose setting is intended to be changed, a communication path in use is not be affected and consequently communication interruption of USB resulting from a change does not occur even after WEP encryption was set up. Therefore, it becomes possible to continuously perform the setup operation via USB.

After the utility is activated, it judges whether there is an undetected port at Step S2001. If there is no undetected port, the flow proceeds to Step S2005, at which the utility judges whether there are ports of the same MAC address. If there are ports of the same MAC address, the utility selects a wired port of the printer at Step S2006. At this time, any wireless ports will be eliminated from the list. If there is no ports of the same MAC address, the flow skips processing at Step S2006. Subsequently, the utility creates a list of the pertinent printer ports (settable ports) at Step S2007.

If there is an undetected port at Step S2001, the flow proceeds to Step S2002, at which the utility detects the next port and judges whether it is the pertinent printer port at Step S2003. Then, if it is the pertinent printer port, its MAC address is acquired at Step S2004. In the network setting application of this embodiment, when a plurality of logical communication ports for the identical printer are detected, only one typical port is presented as a settable port. In this particular case, if there exists a logical communication port of a local interface, such as USB and centronics, the utility gives it precedence over logical communication ports of the network interface.

Thereby, in setting the printer in the network in which a plurality of logical communication ports exist, it becomes possible to select a port through which a stable setup operation can be performed without being at a loss in selecting a port for the setup.

This embodiment takes up a printer equipped with the wireless LAN port and the USB port that is a local port. In the case of a printer equipped with a wireless LAN port and a wired LAN port, it is obvious that when a wireless LAN is being set up, if the setting is changed through a wired LAN port, the setting change does not affect the printer operation similarly. Thus, the present invention can achieve a similar effect by performing a similar control even between a wired LAN interface and a wireless LAN interface as well as between a local interface port and the latter.

In the foregoing, the embodiments of the present invention were described. The present invention may be applied to control of various peripherals, such as copiers, facsimiles, digital cameras, modems, and MIDI apparatuses, in addition to printers.

In addition, the object of the present invention is attained by a computer of a system or equipment (or CPU or MPU) reading and executing a stored program code for realizing a procedure of the flowchart illustrated in the figures to achieve functions of the embodiment.

In this case, since the program code itself read from the storage medium will realize a function of the above-mentioned embodiment, the storage medium storing the program code will compose the present invention.

As storage media for supplying the program code, for example, a floppy disk, a hard disk, an optical disk, a magneto-optical disk, CD-ROM, CD-R, magnetic tape, a non-volatile memory card, ROM, etc. can be used.

Moreover, the present invention includes not only a case where the above-mentioned function of the embodiment is realized by executing the program code read from the computer, but also a case where the OS (operating system) running on the computer or the like executes a part or the whole of actual processing based on directions of the program code and the above-mentioned function of the embodiment is realized by the processing.

Furthermore, the present invention includes a case where a program code read from a storage medium is written in a function expansion board inserted in a computer or in memory provided in a functional expansion unit connected the computer, subsequently a CPU or the like provided in the functional expansion board or the functional expansion unit executes a part or the whole of actual processing based on directions of the program code, and the function of the above-mentioned embodiment is realized by the processing.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

This application claims priority from Japanese Patent Application Nos. 2003-328718 filed Sep. 19, 2003 and 2004-257662 filed Sep. 3, 2004, which are hereby incorporated by reference herein.

What is claimed is:

1. A setting apparatus comprising:
   a computer-readable memory configured to store computer-executable process steps; and
   a processor configured to execute the computer-executable process steps stored in the memory,
   wherein the process steps stored in the memory cause the processor to create a list of printer ports for display, and include computer-executable process steps to:
   judge whether a plurality of logical communication ports exists for a printer;
   exclude a network interface port of the printer before displaying the list of printer ports so as to select a local interface port of the printer if it is judged that the plurality of logical communication ports exists for the printer; and
   create the list of printer ports with the selected local interface port if it is judged that the plurality of logical communication ports exists for the printer, such that a user cannot select the network interface port from the list, or creating a list of printer ports without a selection of the local interface port if it is judged that the plurality of logical communication ports does not exist for the printer.

2. A setting apparatus according to claim 1, wherein the processor acquires information of MAC addresses of the printers that the apparatus can communicate with through respective ports during the judgment and when the same MAC address information is acquired in spite of communication to different ports, the processor judges that the plurality of logical communication ports exists for the printer.

3. A setting apparatus comprising:
   a computer-readable memory configured to store computer-executable process steps; and
   a processor configured to execute the computer-executable process steps stored in the memory,
   wherein the process steps stored in the memory cause the processor to create a list of printer ports for display, and include computer executable process steps to:
   judge whether a plurality of logical communication ports exists for a printer;
   display the list of printer ports without excluding a network interface port of the printer if it is judged that the plurality of logical communication ports for the printer does not exist, or to display the list of printer ports by automatically selecting a local interface port of the printer such that a user can not select the network interface port if it is judged that the plurality of logical communication ports for the printer does not exist; and
   perform setting of network interface communication using a local interface connection that is established via the local interface port of the printer when the printer is selected from the list of the printer ports.

4. A setting apparatus according to claim 3, wherein the processor acquires information of MAC addresses of the printers that the apparatus can communicate with through respective ports during the judgment and when the same MAC address information is acquired in spite of communication to different ports, the processor judges that the plurality of logical communication ports exists for the printer.

5. A method performed by a processor of a setting apparatus to create a list of printer ports for display, comprising:
   judging whether a plurality of logical communication ports exists for a printer;
   excluding a network interface port of the printer before displaying the list of printer ports so as to select a local interface port of the printer if it is judged that the plurality of logical communication ports exists for the printer; and
   creating the list of printer ports with the selected local interface port if it is judged that the plurality of logical communication ports exists for the printer, such that a user cannot select the network interface port from the list, or creating a list of printer ports without a selection of the local interface port if it is judged that the plurality of logical communication ports does not exist for the printer.

6. A method according to claim 5, wherein the judging includes:
   acquiring information of MAC addresses of the printers that the apparatus can communicate with through respective ports; and
   when the same MAC address information is acquired in spite of communication to different ports, judging that the plurality of logical communication ports exists for the printer.

7. A method performed by a processor of a setting apparatus to create a list of printer ports for display, comprising:
   judging whether a plurality of logical communication ports exists for a printer;
   displaying the list of printer ports without excluding a network interface port of the printer if it is judged that the plurality of logical communication ports for the printer does not exist, or to display the list of printer ports by automatically selecting a local interface port of the printer such that a user can not select the network interface port if it is judged that the plurality of logical communication ports for the printer does not exist; and
   performing setting of network interface communication using a local interface connection that is established via the local interface port of the printer when the printer is selected from the list of the printer ports.

8. A method according to claim 7, wherein the judging includes:
   acquiring information of MAC addresses of the printers that the apparatus can communicate with through respective ports; and
   when the same MAC address information is acquired in spite of communication to different ports, judging that the plurality of logical communication ports exists for the printer.

9. A computer-readable non-transitory storage medium having stored thereon computer-executable process steps, wherein the process steps stored in the storage medium cause a processor to create a list of printer ports for display, and include computer-executable process steps to:
   judge whether a plurality of logical communication ports exists for a printer;
   exclude a network interface port of the printer before displaying the list of printer ports so as to select a local interface port of the printer if it is judged that the plurality of logical communication ports exists for the printer; and create the list of printer ports with the selected local interface port if it is judged that the plurality of logical communication ports exists for the printer, such that a user cannot select the network interface port from the list, or creating a list of printer ports without a selection of the local interface port if it is judged that the plurality of logical communication ports does not exist for the printer.

10. A computer-readable non-transitory storage medium according to claim 9, wherein the process steps further cause the processor to acquire information of MAC addresses of the printers that the processor can communicate with through respective ports during the judgment and when the same MAC address information is acquired in spite of communication to different ports, judge that the plurality of logical communication ports exists for the printer.

11. A computer-readable non-transitory storage medium having stored thereon computer-executable process steps, wherein the process steps stored in the storage medium cause a processor to create a list of printer ports for display, and include computer-executable process steps to:

judge whether a plurality of logical communication ports exists for a printer;

display the list of printer ports without excluding a network interface port of the printer if it is judged that the plurality of logical communication ports for the printer does not exist, or to display the list of printer ports by automatically selecting a local interface port of the printer such that a user can not select the network interface port if it is judged that the plurality of logical communication ports for the printer does not exist; and perform setting of network interface communication using a local interface connection that is established via the local interface port of the printer when the printer is selected from the list of the printer ports.

12. A computer-readable non-transitory storage medium according to claim 11, wherein the process steps further cause the processor to acquire information of MAC addresses of the printers that the processor can communicate with through respective ports during the judgment and when the same MAC address information is acquired in spite of communication to different ports, judge that the plurality of logical communication ports exists for the printer.

* * * * *